United States Patent
Vajo et al.

(10) Patent No.: US 7,462,344 B2
(45) Date of Patent: Dec. 9, 2008

(54) METHODS FOR REVERSIBLY STORING HYDROGEN

(75) Inventors: John J. Vajo, West Hills, CA (US); Florian O. Mertens, Freiberg (DE); Sky Skeith, Los Angeles, CA (US); Michael P. Balogh, Novi, MI (US); Frederick E. Pinkerton, Shelby Township, Macomb County, MI (US); Martin S. Meyer, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/758,114

(22) Filed: Jun. 5, 2007

(65) Prior Publication Data
US 2007/0280869 A1 Dec. 6, 2007

Related U.S. Application Data

(63) Continuation-in-part of application No. 11/086,993, filed on Mar. 22, 2005, now abandoned.

(60) Provisional application No. 60/618,870, filed on Oct. 14, 2004, provisional application No. 60/557,038, filed on Mar. 26, 2004.

(51) Int. Cl.
C01B 3/02 (2006.01)
C01B 6/00 (2006.01)
C01B 6/04 (2006.01)

(52) U.S. Cl. ............ 423/648.1; 423/286; 423/644; 423/645; 423/646; 423/647

(58) Field of Classification Search ............ 423/644, 423/645, 646, 647, 658.2, 648.1, 286
See application file for complete search history.

(56) References Cited

U.S. PATENT DOCUMENTS

| 3,971,846 | A  | * | 7/1976 | Skelcey .................. 423/645 |
| 4,341,651 | A  | * | 7/1982 | Beckert et al. .......... 252/188.25 |
| 6,251,349 | B1 | * | 6/2001 | Zaluska et al. .......... 423/286 |
| 6,358,488 | B1 | * | 3/2002 | Suda ..................... 423/657 |
| 6,866,836 | B2 | * | 3/2005 | Jorgensen .............. 423/658.2 |
| 7,083,657 | B2 | * | 8/2006 | Mohring et al. ........ 48/61 |
| 2004/0120889 | A1 | * | 6/2004 | Shah et al. ............. 423/657 |
| 2005/0079129 | A1 | * | 4/2005 | Venkatesan et al. .... 423/658.2 |

OTHER PUBLICATIONS

Argonne National Laboratory, "Basic Research Needs for the Hydrogen Economy", May 13-15, 2003, pp. 95-109.
Vajo et al, Altering Hydrogen Storage Properties by Hydride Destabilization through Alloy Formation, J. Phys. Chem. B, 108 (37) pp. 13977-13983 (2004), no month.
Zaluska et al, "Structure, catalysis and atomic reactions on the nanoscale", Applied Physics A: Materials Science & Processing 72(2), pp. 157-159, 162-165 (Feb. 2001).

(Continued)

Primary Examiner—Wayne Langel

(57) ABSTRACT

The invention provides a method of reversibly storing hydrogen at industrially practicable temperature and pressure conditions. A stable hydrogen storage hydride is mixed with a destabilizing hydride. The stable hydride is capable of releasing hydrogen at a first energy level. When the stable hydride is in the presence of the destabilizing hydride, the stable hydride releases hydrogen at a second energy level. The second energy level is significantly reduced from the first energy level.

29 Claims, 12 Drawing Sheets

OTHER PUBLICATIONS

Vajo et al, "Reversible Storage of Hydrogen in Destabilized LiBH4", J. Phys. Chem. B, 109(9) pp. 3719-3722 (published on the web on Feb. 12, 2005).

Johnson et al, "Computational Studies of Hydrogen Storage: Metal Organic Frameworks and Destabilized Metal Hydrides", found on the web at www.h-workshop.uni-konstanz.de/talks, no date.

Alapati et al "Identification of Destabilized Metal Hydrides for Hydrogen Storage Using First Principles Calculations", J. Phys. Chem. B110, 8769-8776 (2006), no month.

Johnson, Session D6: Simulating Hydrogen Storage: From Current Challenges to Future Promises, 2006 APS March Meeting Event, Abstract D6.00001, no month.

Vajo et al, Altering Hydrogen Storage Properties by Hydride Destabilization through Alloy Formation, J. Phys. Chem. B, 108 (37) pp. 13977-13983 (2004).

Johnson et al, "Computational Studies of Hydrogen Storage: Metal Organic Frameworks and Destabilized Metal Hydrides", found on the web at www.h-workshop.uni-konstanz.de/talks.

Alapati et al "Identification of Destabilized Metal Hydrides for Hydrogen Storage Using First Principles Calculations", J. Phys. Chem. B110, 8769-8776 (2006).

Johnson, Session D6: Simulating Hydrogen Storage: From Current Challenges to Future Promises, 2006 APS March Meeting Event, Abstract D6.00001.

* cited by examiner

METHODS FOR REVERSIBLY STORING HYDROGEN

CROSS-REFERENCE TO RELATED APPLICATIONS

This application is a continuation-in-part of U.S. patent application Ser. No. 11/086,993 filed on Mar. 22, 2005, and claims the benefit of both U.S. Provisional Application No. 60/618,870 filed on Oct. 14, 2004 and U.S. Provisional Application No. 60/557,038 filed on Mar. 26, 2004.

FIELD OF THE INVENTION

The invention relates to methods of reversibly storing and releasing hydrogen.

BACKGROUND OF THE INVENTION

Hydrogen is desirable as a source of energy because it reacts cleanly with air producing water as a by-product. In order to enhance the desirability of hydrogen as a fuel source, particularly for mobile applications, it is desirable to increase the available energy content per unit volume of storage. Presently, this is done by conventional means such as storage under high pressure, at thousands of pounds per square inch, cooling to a liquid state, or absorbing hydrogen into a solid such as a metal hydride. Pressurization and liquification require relatively expensive processing and storage equipment.

Storing hydrogen in a solid material provides relatively high volumetric hydrogen density and a compact storage medium. Hydrogen stored in a solid is desirable since it can be released or desorbed under appropriate temperature and pressure conditions, thereby providing a controllable source of hydrogen.

Presently, it is desirable to maximize the hydrogen storage capacity or content released from the material, while minimizing the weight of the material to improve the gravimetric capacity. Further, many current materials only absorb or desorb hydrogen at very high temperatures and pressures, which results in costly and industrially impractical energy requirements. Additionally, many of these systems are not readily reversible, in that they cannot absorb hydrogen upon contact at reasonable temperature and pressure conditions, and as such do not cyclically absorb and desorb hydrogen in an industrially practicable manner. Thus, it is desirable to find a hydrogen storage material that generates (releases) and reabsorbs hydrogen at relatively low temperatures and pressures, and further has a high gravimetric hydrogen storage density. There is an ever growing demand for a reversible high hydrogen content hydrogen storage material that minimizes required energy input.

SUMMARY OF THE INVENTION

One embodiment of the invention provides a method of reversibly storing hydrogen at industrially practicable temperature and pressure conditions. The method comprises providing a mixture comprising a stable hydrogen storage hydride and a destabilizing hydride. The stable hydride is capable of releasing hydrogen at a first energy level (E1). The stable hydride is reacted with the destabilizing hydride in a reaction to release hydrogen at a second energy level (E2). The second energy level E2 is less than the first energy level E1. The reaction is substantially reversible at the industrially practicable pressure and temperature conditions.

In one embodiment, the invention provides a method of reversibly storing hydrogen comprising providing a mixture of a stable hydrogen storage hydride and a destabilizing hydride. The stable hydride is capable of releasing hydrogen at a first energy level ($E_1$) and is represented by the nominal general formula $AH_x$, wherein A comprises at least one element of Group 13 or Group 15 of the Periodic Table. The destabilizing hydride is represented by the nominal general formula $MH_y$. The method comprises reacting the stable hydride with the destabilizing hydride to release hydrogen at a second energy level ($E_2$). $E_2$ is less than $E_1$. The reacting occurs by the following reaction:

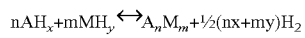

$$nAH_x + mMH_y \leftrightarrow A_nM_m + \tfrac{1}{2}(nx+my)H_2$$

wherein M is one or more cationic species that are distinct from A, and n, m, x, and y are selected so as to maintain electroneutrality. The reaction is substantially reversible at the industrially practicable pressure and temperature conditions.

In another embodiment, the invention provides a method of reversibly storing hydrogen at industrially practicable temperature and pressure conditions. The method comprises providing a mixture having a stable hydrogen storage hydride and a destabilizing hydride. The stable hydride is capable of releasing hydrogen at a first energy level ($E_1$). The reacting of the stable hydride with the destabilizing hydride releases hydrogen at a second energy level ($E_2$). $E_2$ is less than $E_1$ and $E_2$ is related to a free energy of less than about 10 and greater than 0 kJ/mol-$H_2$. The reaction is substantially reversible at industrially practicable pressure and temperature conditions.

Further areas of applicability of the invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

The invention will become more fully understood from the detailed description and the accompanying drawings, wherein.

DETAILED DESCRIPTION OF THE EXEMPLARY EMBODIMENTS

Figures 1A, 1B:
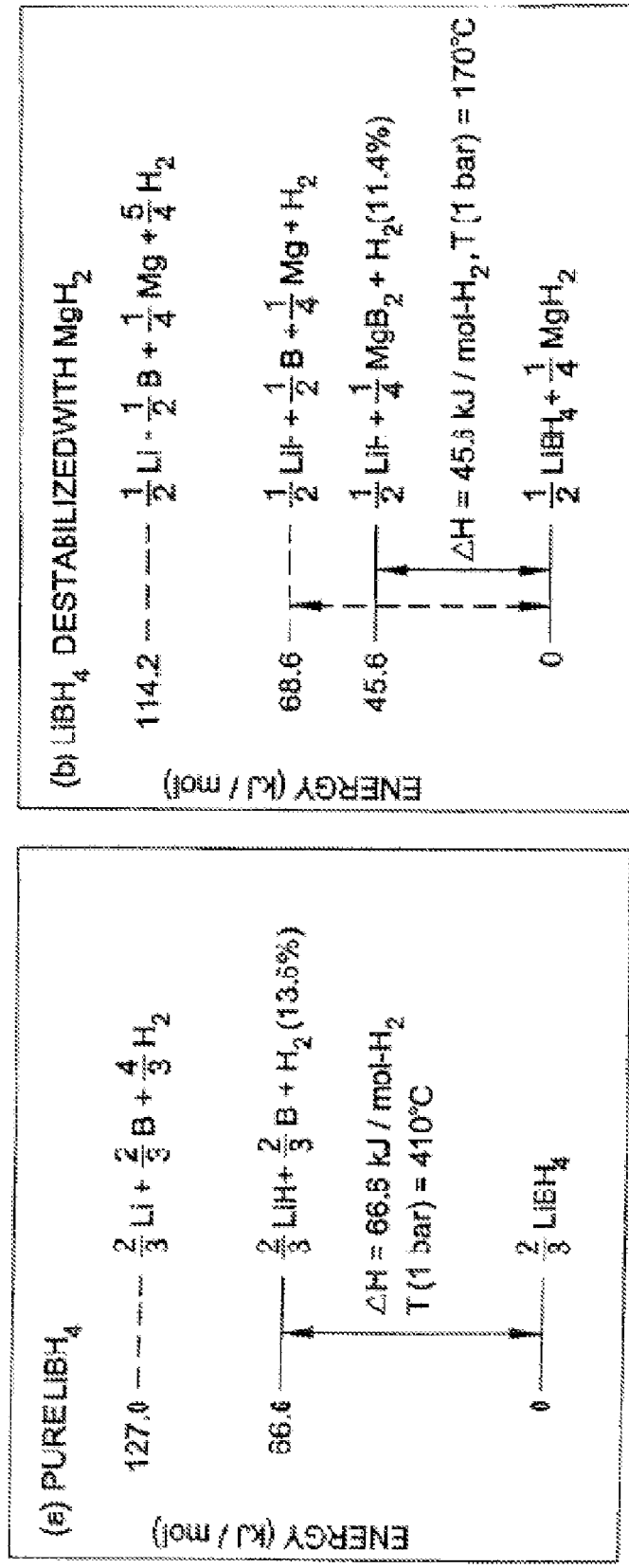
FIG. 1A shows comparative energy diagrams of a prior art stable hydride, lithium borohydride or $LiBH_4$.
FIG. 1B shows one embodiment of a hydrogen storage material of the invention combining a stable hydride $LiBH_4$ and a destabilizing hydride, magnesium hydride or $MgH_2$.

The following description of embodiment(s) is merely exemplary in nature and is in no way intended to limit the invention, its application, or uses. The following definitions and non-limiting guidelines must be considered in reviewing the description of this invention set forth herein. The description and any specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make and use the compositions and methods of this invention and, unless explicitly stated otherwise, are not intended to be a representation that given embodiments of this invention have, or have not, been made or tested.

As used herein, the word "include," and its variants, is intended to be non-limiting, such that recitation of items in a list is not to the exclusion of other like items that may also be useful in the materials, compositions, devices, and methods of this invention.

As used herein, the term "about," when applied to the value for a parameter of a composition or method of this invention, indicates that the calculation or the measurement of the value allows some slight imprecision without having a substantial effect on the chemical or physical attributes of the composition or method. If, for some reason, the imprecision provided by "about" is not otherwise understood in the art with this ordinary meaning, then "about" as used herein indicates a possible variation of up to 5% in the value.

The invention provides a hydrogen storage material system that is capable of releasing relatively high hydrogen content and reversibly storing hydrogen at industrially practicable temperature and pressure conditions. In various embodiments of the invention, a mixture is provided of a stable hydrogen storage hydride composition combined with a destabilizing composition to provide a reversible high-hydrogen content hydrogen storage material. In one embodiment the destabilizing composition comprises at least one destabilizing hydride. While in the presence of the destabilizing hydride, the stable hydride releases hydrogen and reversibly absorbs hydrogen at significantly lower temperature and pressure conditions, making the hydrogen storage material of the invention particularly suitable for various applications such as mobile hydrogen applications.

By "reversible" it is meant that one or more of the hydrogen starting materials is capable of being regenerated at temperature and pressure conditions which are economically and industrially useful and practicable. In the same manner, a "non-reversible reaction" generally applies to both reactions that are traditionally considered irreversible because they generally are not capable of reacting via the same reaction mechanism pathway, but also includes those reactions where regenerating a species of a hydrogen containing starting material by exposure to hydrogen is carried out at impractical processing conditions, such as extreme temperature, extreme pressure, or cumbersome product removal, which prevents its widespread and practical use. Currently, hydrogen storage compositions that release hydrogen endothermically are typically considered the best candidates for reversible hydrogen storage at desirable temperature and pressure conditions.

In various embodiments of the invention, "reversible" reactions include those where exposing one or more product compositions to hydrogen regenerates a species of one or more of the starting materials, while enabling a hydrogen release of about 5 wt % or more, and in some embodiments about 7 wt % or more. As appreciated by one of skill in the art, the concept of industrially practicable reversibility includes evaluating the weight percent of hydrogen released, as balanced with the energy input necessary to reversibly cycle (release and absorb) hydrogen. For example, an endothermic hydrogen storage material may require a high energy input to release hydrogen. However, this energy input may be offset by a relatively high hydrogen content (concentration of hydrogen released from the material) such that some of the hydrogen being released can be consumed as energy to fuel additional release of hydrogen. Yet, overall the hydrogen storage material releases a sufficient amount of hydrogen to be a suitable candidate for fuel cell applications.

One embodiment of the invention includes a hydrogen storage material system that has a reduction in the overall energy requirements for storing and subsequently releasing hydrogen. Minimizing the overall enthalpy changes associated with the hydrogen storage material system results in an improvement in the overall efficiency of an associated fuel cell system. As the overall enthalpy change increases, so does the requirement for managing heat transfer systems (heating and cooling operations). In particular, it is highly advantageous to minimize heating and cooling systems in mobile units containing fuel cells that consume hydrogen (e.g., vehicles or electronic devices), because additional systems draw parasitic energy and increase the overall weight of the mobile unit, thereby decreasing its gravimetric efficiency.

A brief background is provided herein to enable a better understanding of the inventive concepts of various embodiments of the invention. Higher hydrogen capacities have been deemed necessary for commercial development of vehicles and other mobile products powered by hydrogen/oxygen proton exchange membrane fuel cells. Based on the current understanding of hydrogen storage materials, it appears that most transition metal-based hydride materials do not have hydrogen capacities of greater than 4-6 wt %. Thus, development has focused on low-Z complex hydrides, where Z is the atomic number of an element and "low-Z" refers to compounds having relatively low atomic numbers that are lightweight compounds. Such low-Z complex hydrides, include, for example, alanates ($AlH_4^-$), amides ($NH_2^-$), and borohydrides ($BH_4^-$). Use of such hydrides for hydrogen storage is challenging because of both the kinetic and thermodynamic limitations. For example, the reversible formation of many complex hydrides is associated with slow kinetics, although it is possible to improve reaction rates with appropriate catalysts. Thermodynamically, the stability of a complex hydride must lie within a specific range in order for the hydrogenation/dehydrogenation phase boundary to occur at practical pressures and temperatures. Many low-Z alanates are generally considered too unstable and difficult to control because they readily release hydrogen at ambient temperatures and pressures. However, some alanates, such as $NaAlH_4$, do form hydrides that require higher temperatures and pressures to evolve hydrogen. Most borohydrides, for example $LiBH_4$ and $NaBH_4$, are very stable, and as such are difficult to use at typical fuel cell operating temperature and pressure conditions.

FIG. 1A shows an energy diagram of a prior art hydrogen storage hydride material, pure lithium borohydride, $LiBH_4$. FIG. 1A shows the energy diagram for $LiBH_4$ calculated based on predicted products and performed using HSC Chemistry software. While the total hydrogen content of $LiBH_4$ is relatively high at above about 18 wt %, pure $LiBH_4$ does not reversibly store significant hydrogen, and the products of the decomposition of $LiBH_4$ have not been clearly identified. A predicted partial decomposition reaction produces LiH, B, and 3/2 $H_2$, and has a theoretical yield of 13.6 wt % hydrogen. However, the calculated standard enthalpy for this reaction is about +67 kJ/mol-$H_2$ and thus, even if reversible, an equilibrium pressure of 1 bar requires a temperature of greater than 400° C. Such a temperature is generally considered too high for practical hydrogen storage applications.

In such a manner, $LiBH_4$ can be defined as a "stable" hydride, meaning that the composition requires a prohibitive input of energy in order to release hydrogen because it is thermodynamically stable. By the term "prohibitive" it is meant that the energy required is industrially impracticable, particularly for mobile consumer products, and tends to preclude the use of the material due to excessive energy requirements.

The modification of hydrogenation/dehydrogenation thermodynamics can be accomplished with various material systems by using destabilizing additives that form alloys or compounds with a stable hydride composition. When a destabilizing composition is added to a stable hydrogen storage composition to favorably alter the thermodynamics for hydrogen storage applications, the equilibrium pressure is increased, and thus reduces the energy input requirements for the overall system. In one example, a destabilizing compound reacts with the stable hydrogen storage compound to form additional or modified reactants and/or products to arrive at more favorable thermodynamics. Hydrides of many Period 2 and 3 elements (of the Periodic Table) are known in the art to have relatively high hydrogen densities, for example greater than 5-6 wt %. However, most of these hydrides are quite stable and do not release hydrogen until the temperature exceeds 250° C. at 1 bar.

Two examples of such materials are lithium hydride (LiH) and magnesium hydride ($MgH_2$). Lithium hydride contains 12.5 wt % hydrogen, but requires 910° C. for an equilibrium pressure of 1 bar. Magnesium hydride contains 7.7 wt % hydrogen and has a 1 bar equilibrium pressure at 275° C. The thermodynamics of the magnesium hydride can be altered by using additives that form alloys or compounds with Mg in either or both the hydrogenated and/or dehydrogenated states. A well-known example is adding nickel to the magnesium to form $Mg_2Ni$ in the starting materials, which, upon hydrogenation, forms $Mg_2NiH_4$ with 3.6 wt % hydrogen and an equilibrium pressure of 1 bar at 245° C. Elemental aluminum has been found to destabilize $MgH_2$ by forming a Mg/Al alloy upon dehydrogenation. The reaction is reversible with $MgH_2$ and Al reforming and segregating during hydrogenation. At 280° C., the more favorable equilibrium pressure is a factor of 3 larger than that of pure $MgH_2$.

To achieve a higher equilibrium pressure for strongly bound stable hydride systems (that translates to reduced energy requirements to desorb hydrogen), additives can be introduced to the stable hydride to form compounds or alloys with the dehydrogenated metals. Destabilization occurs because the system can cycle between the hydride and the newly formed and more thermodynamically favorable compound(s) instead of the less favorable dehydrogenated elemental metal(s). A destabilizing element, for example silicon (Si), destabilizes certain stable hydride storage systems, such as lithium hydride or magnesium hydride. The added silicon forms relatively strong bonds with either lithium or magnesium. These newly formed strong bonds reduce dehydrogenation enthalpies and increase equilibrium hydrogen pressures. Other useful elemental destabilizers for stable hydrides include, by way of example, silicon (Si), aluminum (Al), and copper (Cu).

Thus, one embodiment of the invention provides methods of destabilizing one or more stable hydride species. To this end, one object is to increase the equilibrium pressure of various strongly bound stable hydrides to in essence reduce the required system enthalpy and stabilize the dehydrogenated state. Stabilizing the dehydrogenated state reduces the enthalpy for dehydrogenation, thereby increasing the equilibrium hydrogen pressure. Using this approach, the thermodynamic properties of reversible hydrogen storage material systems can potentially be tuned to a finer extent than would be possible with individual materials to achieve reversible hydrogen release at practical temperature and pressure conditions.

However, it is also desirable to increase the hydrogen content of the overall hydrogen storage system. In various embodiments, the invention may provide a relatively high yield of hydrogen gas from a hydrogen storage material, while minimizing the energy input required for the reversible system. In various embodiments, the invention provides relatively light-weight reversible hydrogen storage materials. In various embodiments of the invention the reversible hydrogen storage materials may have gravimetric system capacities of greater than 5 to 9 wt % hydrogen.

Thus, the invention provides in various embodiments a high hydrogen content hydrogen storage system that comprises a stable hydride material and a destabilizing hydride material, where each of the reactants potentially contribute to the amount of released hydrogen for consumption in the fuel cell Hence, both the stable hydride and the destabilizing hydride provide hydrogen to increase the hydrogen content released. Additionally, in accordance with the invention, as previously described, the addition of a destabilizing hydride with a stable hydride favorably improves the reaction thermodynamics, such that the required energy input or enthalpy is reduced by increasing the equilibrium pressure of the hydrogen storage system. It should be noted that predicted thermodynamics and equilibrium pressures are useful for selecting hydrogen storage materials of the invention, however a discrepancy between the calculated or predicted values associated with energy levels (e.g., equilibrium pressure, enthalpy) and the actual values is often observed.

In various embodiments, the invention provides a method of reversibly storing hydrogen at industrially practicable temperature and pressure conditions. A stable hydrogen storage hydride is mixed with a destabilizing hydride. The stable hydride is characterized by releasing hydrogen in a first reaction having a first free energy level ($E_1$). The first energy level is related to a change in enthalpy denoted by $\Delta H$. Also associated with the release of hydrogen is a change in entropy denoted by $\Delta S$. The changes in enthalpy and entropy can be used to determine the change in Gibbs free energy which is generally expressed as:

$$\Delta G = \Delta H - T\Delta S = -RT(\ln K_{eq}) \quad \text{(Equation 1)}$$

where $K_{eq}$ is the equilibrium constant, H is the enthalpy, S is the entropy, T is the absolute temperature in Kelvins, and R is the gas constant. The Gibbs free energy change relates to the thermodynamic feasibility of a chemical reaction. If $\Delta G>0$, the reaction cannot spontaneously occur. If $\Delta G<0$, the reaction can occur spontaneously if there are no kinetic limitations along the reaction pathway. The temperature at which a reaction becomes thermodynamically feasible is the temperature at which $\Delta G=0$ or alternatively $K_{eq}=1$. This temperature is generally determined by the following equation:

$$T(\Delta G=0) = \Delta H/\Delta S \quad \text{(Equation 2)}$$

The entropic contribution to the free energy, represented by the term $T\Delta S$, compensates for the higher enthalpy or energy level that must be attained to enable a particular reaction to occur. Because hydrogen is a low molecular weight diatomic gas, the entropy of hydrogen gas to a large extent dominates the entropy change associated with hydrogen release reactions regardless of the solid phase components that are involved. Hence, the free energy can be generally expressed as a required "energy level" that must be applied or input to the system to enable a desired reaction.

Thus, the effect of mixing a stable hydride with a destabilizing hydride is approximately determined by the associated enthalpy or energy level changes. When a stable hydride is combined with a destabilizing hydride, hydrogen release can occur in a second reaction having a lower $\Delta H$ and, consequently a lower reaction temperature. After mixing the stable hydride with the destabilizing hydride, a two phase hydrogen storage material is formed. The stable hydride is then reacted with the destabilizing hydride in a second hydrogen release reaction that has a second energy level ($E_2$). In accordance with the invention, the energy level for the second reaction, $E_2$, is less than the first energy level for the stable hydride by itself, $E_1$. Such energy level changes are demonstrated in FIG. 1B where the hydrogen storage material comprises a stable hydride lithium borohydride ($LiBH_4$) combined with a destabilizing compound ($MgH_2$). Stated in another way, the stable hydride is capable of releasing hydrogen at a first energy level. However, when the storage material comprising the stable hydride is in the presence of the destabilizing hydride, the storage material releases hydrogen at a second energy level, and the second energy level may be significantly reduced from the first energy level.

As can be observed from the prior art depicted in FIG. 1A, which was discussed above, in the absence of magnesium hydride, the stable hydride lithium borohydride releases hydrogen in an endothermic reaction which requires $\Delta H=+66.6$ kJ/mol-$H_2$ and the equilibrium pressure at 1 bar has a temperature of 410° C. However, with the addition of the destabilizing hydride in accordance with the embodiment of the invention shown in FIG. 1B (where the hydrogen storage system comprises a stable hydride $LiBH_4$ and a destabilizing hydride $MgH_2$), the combined hydrogen storage material has a reduced enthalpy, $\Delta H=+45.6$ kJ/mol-$H_2$, where the equilibrium pressure is calculated to be 1 bar with a temperature of 170° C. The stability of the $MgB_2$ alloy reduces the standard enthalpy for dehydrogenation from about +66 kJ/mol-$H_2$ to about +46 kJ/mol-$H_2$, which translates to a reduction of 30% in energy. The temperature reduction is 240° C. at a pressure of 1 bar, which likewise equates to a reduction in the required energy input.

The second energy level $E_2$ is less than the first energy level for the stable hydride by itself, $E_1$. It should be noted that combining the stable hydride $LiBH_4$ with the destabilizing hydride $MgH_2$ actually destabilizes both the $LiBH_4$ and the $MgH_2$ in this case, to release hydrogen at a lower enthalpy than either the stable hydride or destabilizing hydride by itself, as will be discussed in more detail below.

Thus, for various embodiments of the invention, the second energy level $E_2$ may be significantly reduced from the first energy level $E_1$ for the hydrogen storage material. A "significant" reduction may be at least 10% reduction between the energy levels. In various embodiments, the second energy level $E_2$ is at least 20% less than the first energy level $E_1$, and in other embodiments, the difference in energy level is at least 30%.

In various embodiments of the invention, the first energy level is related to a first temperature that the system must achieve to release hydrogen from the stable hydride alone, and the second energy level is related to a second temperature required to release hydrogen in the reaction between the stable hydride and destabilizing hydride. In various embodiments, the first temperature is greater than about 250° C. and the second temperature is less than 250° C. at a pressure of 1 bar. In other embodiments, the second temperature is less than about 200° C. In alternate embodiments, the second temperature is less than about 175° C. In some embodiments the second temperature required to release hydrogen may be reduced as low as possible for the hydrogen storage material.

The reduction in the energy level can also be related to the equilibrium pressure of the respective hydrogen storage systems. Thus, a prior art system, such as $LiBH_4$, has an equilibrium pressure that is less or equal to about 1 bar at 400° C., as where various embodiments of hydrogen storage material systems of the invention have a significantly increased equilibrium pressure at 400° C. of greater than 10 bar or greater than 12 bar. Thus, the first energy level is related to a first equilibrium pressure reflected in an equilibrium pressure that is low (about 1 bar or less) at 400° C., as where the second energy level is related to a second equilibrium pressure that is significantly higher (greater than about 10 bar) at the same temperature, correlating the reduced second energy level.

Hence, in various embodiments, the addition of the destabilizing hydride alters the thermodynamics of the hydrogen storage material hydrogen desorption reaction, and further enables a reversible hydrogenation reaction, where one or more of the products formed during the dehydrogenation reaction can be rehydrogenated upon exposure to hydrogen gas. The ease of reversibility of the reaction is correlated to the free energy level of the products. As the overall Gibb's free energy level for the hydrogen release approaches zero, the reversibility occurs with increasingly greater ease. As previously described, one particular application for the hydrogen storage materials is a mobile fuel cell application. In various embodiments, hydrogen storage materials both release and recharge hydrogen at industrially practicable temperature and pressures. Generally speaking, these temperatures in the vehicular fuel cell applications correspond to a range of approximately ambient temperature to fuel cell operating temperatures. Exemplary operating temperatures generally range up to about 150° C. Operating temperatures may be from about 80° C. to about 100° C. In various embodiments, the hydrogen storage material is selected to desorb and absorb around the operating temperatures of the mobile fuel cell. For example, this can be achieved by selecting a hydrogen storage material system that has a free energy that approaches zero at the appropriate temperature conditions (in that the enthalpy term ($\Delta H$) of Equation 1 is nearly equal to the entropy term ($T\Delta S$)). In various embodiments, the reaction enthalpy is endothermic. In various embodiments of the invention, the second energy level $E_2$ correlates to an enthalpy of less than about +45 kJ/mol-$H_2$ and greater than about +30 kJ/mol-$H_2$ at ambient temperatures (ambient temperatures include a range of temperatures at which mobile applications may operate, which include, by way of example, approximately −35° C. to 25° C.) to about 150° C. and ambient pressure (approximately 1 bar) demonstrating a relatively facile and controllable reversible reaction system. In other embodiments, the enthalpy is about +35 kJ/mol-$H_2$, which relates to good control and reversibility at current operating temperatures in mobile fuel cell applications, although the material can be selected for any range of temperatures and corresponding enthalpy.

In various embodiments of the invention, the destabilizing hydride is capable of releasing hydrogen in a third reaction (in the absence of the stable hydride) and has a third energy level $E_3$. In the case of certain destabilizing hydrides, the second energy level $E_2$ is less than the third energy level $E_3$, thus the combined hydrides that form the hydrogen storage material of the invention encounter a lower free energy in combination than either hydride would have by itself upon releasing hydrogen. One such example is where the destabilizing hydride is $MgH_2$ and the stable hydride is $LiBH_4$. When these compounds are combined, the free energy is less than the respective free energy for hydrogen release for the individual compounds.

Thus, in various embodiments, the invention provides a solid state hydrogen storage material system that comprises a hydrogenated state where hydrogen is "stored" in the reactants and another dehydrogenated state subsequent to hydrogen release corresponding to the products. In various embodiments of the invention, the hydrogenated state comprises two separate solid phases, the first phase corresponding to a stable hydride and the second solid phase corresponding to the destabilizing compound or hydride. In various embodiments, the solid phase reactants are milled to reduce the average diameter particle size and to increase the surface area of the particles prior to reacting. It should be noted that with hydrogen storage material systems of the invention, ball milling reduces particle size and mixes the starting reactants, but generally does not facilitate a reaction between them, as is often observed in other hydrogen storage material systems when they are ball-milled. In various embodiments, the average particle diameter size is reduced to less than about 25 µm, or in other embodiments less than about 15 µm.

A stable hydrogen storage hydride is represented by the nominal general formula $AH_x$, where A comprises at least one element of Group 13 or Group 15 of the Periodic Table. The hydrogen storage material also comprises a destabilizing hydrogen storage hydride which can be represented by the nominal general formula $MH_y$, where M is one or more cationic species distinct from A. Further, x and y are selected so as to maintain electroneutrality. In the absence of the destabilizing hydride, the stable hydride would require a prohibitive energy input to release hydrogen.

The cationic species A of the stable hydride comprises one or more elements other than hydrogen, for example at least one element of Group 13 or Group 15 of the Periodic Table. In various embodiments, the cationic species A comprises at least one of aluminum (Al), boron (B), gallium (Ga), indium (In), thallium (Tl), arsenic (As), nitrogen (N), or antimony (Sb). In accordance with various embodiments of the invention, the stable hydride may include a cationic species A comprising boron (B).

In various embodiments of the invention, A is a complex cationic species, which comprises two or more distinct cationic species. Hydrides are often referred to as complex hydrides, which are further contemplated in the invention. A complex hydride comprises two cationic species other than hydrogen, however one of the cationic species forms an anionic group with hydrogen, which further interacts with a second cationic species. This concept can be expressed by the following formula with a hydride expressed as $A^xH_x$, where A comprises two distinct cationic species, A' and A", so that $A=A'+A"$. Thus, the hydride can generally be expressed as: $A'_d(A"H_c)^{-b}_e$ where $(A"H_c)$ is an anionic group, where ad=be, and a, b, c, d, and e are selected so as to maintain charge balance and electroneutrality of the compound. As appreciated by one of skill in the art, suitable complex hydrides include those where A comprises additional cationic species that differ from the general expression described above, and A may comprise multiple cationic species or a compound, so long as the charge balance and electroneutrality of the complex hydride are maintained.

In various embodiments of the invention, where the stable hydride is a complex cationic species, A further comprises at least one element of Group 1 or Group 2 of the Periodic Table, in addition to at least one element of Group 13 or Group 15. Thus, where the stable hydride is a complex hydride, A may comprise at least one of barium (Ba), beryllium (Be), calcium (Ca), cesium (Cs), potassium (K), lithium (Li), magnesium (Mg), sodium (Na), rubidium (Rb), or strontium (Sr). In another embodiment, where the stable hydride is a complex hydride, A comprises at least one of boron (B), aluminum (Al), lithium (Li), sodium (Na), potassium (K), beryllium (Be), magnesium (Mg), or calcium (Ca). In another embodiment, the stable hydride is a complex hydride that comprises boron (B) and also comprises lithium (Li), magnesium (Mg), or sodium (Na). In alternate embodiments, the stable hydride is a complex hydride and A comprises at least one transition metal. Transition metals include elements of Groups 3 to 12 of the Periodic Table.

In various embodiments of the invention, the stable hydride is at least one of lithium borohydride ($LiBH_4$), sodium borohydride ($NaBH_4$), lithium aluminum hydride ($LiAlH_4$), magnesium borohydride ($Mg(BH_4)_2$), magnesium aluminum hydride ($Mg(AlH_4)_2$), sodium aluminum hydride ($NaAlH_4$), calcium borohydride ($Ca(BH_4)_2$), or calcium aluminum hydride ($Ca(AlH_4)_2$). In other embodiments of the invention, the stable hydride is at least one of lithium borohydride (LiBH$_4$), sodium borohydride (NaBH$_4$), or magnesium borohydride (Mg(BH$_4$)$_2$).

In one embodiment, the cationic species M in the destabilizing hydride MH$_y$ comprises one or more cationic species distinct from those in A. The elements of the cationic species M may be distinct from those of the stable hydride to enable a thermodynamic modification of the hydrogen release reaction in accordance with the invention.

In one embodiment, the cationic species M may be represented by a single cationic species or a mixture of cationic species other than hydrogen (e.g., a complex hydride). Examples of suitable cationic species include metal cations, non-metal cations (such as boron), and non-metal cations which are organic (such as CH$_3$). In various embodiments, the destabilizing hydride comprises at least one transition metal. Transition metals include elements of Groups 3 to 12 of the Periodic Table. The cationic species may comprise at least one of aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), vanadium (V), tungsten (W), yttrium (Y), ytterbium (Yb), zinc (Zn), zirconium (Zr), or organic cations including methyl groups (CH$_3$).

In one embodiment, the cations for the cationic species M of the destabilizing hydride include at least one of aluminum (Al), barium (Ba), beryllium (Be), boron (B), calcium (Ca), cesium (Cs), iron (Fe), gallium (Ga), germanium (Ge), indium (In), lithium (Li), magnesium (Mg), nitrogen (N), potassium (K), rubidium (Rb), silicon (Si), sodium (Na), strontium (Sr), titanium (Ti), thallium (Tl), tin (Sn), or zirconium (Zr). In various embodiments, where the hydride is a complex hydride, M comprises at least one of aluminum (Al), beryllium (Be), boron (B), calcium (Ca), lithium (Li), magnesium (Mg), nitrogen (N), potassium (K), or sodium (Na).

In various embodiments of the invention, the destabilizing hydride is a "binary" hydride, meaning that the hydride comprises hydrogen and only one other cationic species M. In binary hydrides, typically the cationic species M is an alkali or alkaline earth metal (Groups 1 and 2 of the Periodic Table). Non-limiting examples of binary hydrides include LiH, NaH, MgH$_2$, CaH$_2$, and the like.

In various embodiments of the invention, the destabilizing hydride is at least one of lithium hydride (LiH), sodium hydride (NaH), potassium hydride (KH), magnesium hydride (MgH$_2$), calcium hydride (CaH$_2$), lithium aluminum hydride (LiAlH$_4$), sodium borohydride (NaBH$_4$), lithium borohydride (LiBH$_4$), magnesium borohydride (Mg(BH$_4$)$_2$), or sodium aluminum hydride (NaAlH$_4$).

In accordance with an embodiment of the invention, the hydrogen storage material comprising a stable hydride and a destabilizing hydride releases hydrogen by the following reversible reaction:

$$nAH_x + mMH_y \leftrightarrow A_nM_m + \tfrac{1}{2}(nx+my)H_2$$

wherein n, m, x, and y are selected so as to maintain electroneutrality. The reaction produces both H$_2$, as well as a byproduct compound A$_n$M$_m$. It should be noted that the byproduct compound A$_n$M$_m$ may thermodynamically favor decomposing into further smaller and/or distinct byproduct compounds. These further byproducts are formed of the same general constituents as the primary byproduct, but they have different valence states, atomic ratios, or stoichiometry, depending on the cationic species involved, as recognized by one of skill in the art. Such additional distinct byproduct compounds may include metal hydrides, which may slightly detract from the total amount of hydrogen generated designated as $\tfrac{1}{2}$(nx+my) H$_2$. For example, in one embodiment, where the stable hydride is a complex hydride (i.e., where A is a complex cationic species) the material releases hydrogen by the following reversible reaction:

$$nA'^cA''^dH_{(c+d)} + m\,MH_y \leftrightarrow nA'H_c + A''_nM_m + \tfrac{1}{2}(nd+my)H_2$$

wherein n, m, c, d, x, and y are selected so as to maintain electroneutrality.

In various embodiments of the invention, the stable hydride is a complex hydride and the destabilizing hydride is a binary hydride. In one embodiment, a stable hydride is lithium borohydride (LiBH$_4$) and a destabilizing hydride is magnesium hydride (MgH$_2$). In another embodiment, a hydrogen storage material has a stable hydride, sodium borohydride (NaBH$_4$) and a destabilizing hydride, lithium hydride (LiH). Yet another embodiment is a hydrogen storage material where a stable hydride is sodium borohydride (NaBH$_4$) and a destabilizing hydride is magnesium hydride (MgH$_2$). Other embodiments include, a stable hydride: lithium borohydride (LiBH$_4$) and a destabilizing hydride: sodium hydride (NaH); a stable hydride: magnesium borohydride (Mg(BH$_4$)$_2$) and a destabilizing hydride: lithium hydride (LiH); a stable hydride: magnesium borohydride (Mg(BH$_4$)$_2$) and a destabilizing hydride: sodium hydride (NaH); a stable hydride: lithium borohydride (LiBH$_4$) and a destabilizing hydride: sodium borohydride (NaBH$_4$); stable hydride: lithium borohydride (LiBH$_4$) and a destabilizing hydride: sodium borohydride (NaBH$_4$); a stable hydride: lithium borohydride (LiBH$_4$) and a destabilizing hydride: lithium aluminum hydride (LiAlH$_4$); a stable hydride: lithium borohydride (LiBH$_4$) and a destabilizing hydride: sodium aluminum hydride (NaAlH$_4$); a stable hydride: sodium borohydride (NaBH$_4$) and a destabilizing hydride: sodium aluminum hydride (NaAlH$_4$); a stable hydride: lithium borohydride (LiBH$_4$) and a destabilizing hydride: calcium hydride (CaH$_2$).

In alternate embodiments of the invention, the hydrogen storage material may comprise a plurality of distinct stable hydride compositions, or a plurality of destabilizing hydride compositions, or a plurality of both stable hydrides and destabilizing hydrides. In other embodiments, the hydrogen storage material comprises a stable hydride and a destabilizing hydride, and further comprises a destabilizing compound, that is distinct from the destabilizing hydride, where the destabilizing compound promotes the release of hydrogen from the storage material at a reduced energy level from that of the stable hydride by itself. In various embodiments, the additional destabilizing compound achieves an even greater reduction for the second energy level E$_2$ than would be achieved for the mixture of the destabilizing hydride and the stable hydride in the absence of the additional destabilizing compound. Examples of some destabilizing compounds include elemental forms of silicon (Si), aluminum (Al), and copper (Cu).

Examples of reactions according to various embodiments of the invention which reduce the energy of the hydrogen storage system comprise:

1) $2\ LiBH_4 + MgH_2 \rightarrow 2\ LiH + MgB_2 + 4\ H_2$ (Reaction 1), which generates a theoretical 11.4 wt % hydrogen and has a predicted enthalpy of reaction of +45.6 kJ/mol-$H_2$, and a predicted equilibrium temperature of 170° C. at 1 bar (although the measure equilibrium temperature was approximately 225° C. at 1 bar).

Other non-limiting examples of alternate embodiments according to the invention where hydrogen generation occurs based on predicted thermodynamics, include the following exemplary reactions:

$$NaBH_4 + \frac{1}{2}LiAlH_4 \rightarrow NaH + \frac{1}{2}LiH + \frac{1}{2}AlB_2 + \frac{9}{4}H_2 \text{ (Reaction 2)},\quad 2)$$

which generates a theoretical 7.8 wt % hydrogen, has a predicted enthalpy of reaction at 20° C. of 32.6 kJ/mol-$H_2$ and a predicted equilibrium temperature of 70° C. at 1 bar.

$$LiBH_4 + \frac{1}{2}LiAlH_4 \rightarrow \frac{3}{2}LiH + \frac{1}{2}AlB_2 + \frac{9}{4}H_2 \quad \text{(Reaction 3)},\quad 3)$$

which generates a theoretical 10.9 wt % hydrogen, has a predicted enthalpy of reaction at 20° C. of 16.8 kJ/mol-$H_2$ and a predicted equilibrium temperature of 90° C. at 1 bar.

$$LiBH_4 + \frac{1}{2}NaAlH_4 \rightarrow LiH + \frac{1}{2}NaH + \frac{1}{2}AlB_2 + \frac{9}{4}H_2 \quad \text{(Reaction 4)},\quad 4)$$

which generates a theoretical 9.1 wt % hydrogen, has a predicted enthalpy of reaction at 20° C. of 23.3 kJ/mol-$H_2$ and a predicted equilibrium temperature of 0° C. at 1 bar.

$$NaBH_4 + \frac{1}{2}NaAlH_4 \rightarrow \frac{3}{2}NaH + \frac{1}{2}AlB_2 + \frac{9}{4}H_2 \quad \text{(Reaction 5)},\quad 5)$$

which generates a theoretical 6.9 wt % hydrogen, has a predicted enthalpy of reaction at 20° C. of 39.2 kJ/mol-$H_2$ and a predicted equilibrium temperature of 150° C. at 1 bar.

$$NaBH_4 + \frac{1}{2}MgH_2 \rightarrow NaH + \frac{1}{2}MgB_2 + 2H_2 \quad \text{(Reaction 6)},\quad 6)$$

which generates a theoretical 7.9 wt % hydrogen, has a predicted enthalpy of reaction at 20° C. of 63.6 kJ/mol-$H_2$ and a predicted equilibrium temperature of 350° C. at 1 bar.

7) $6\ LiBH_4 + CaH_2 \leftrightarrow 6\ LiH + CaB_6 + 10H_2$ (Reaction 7), which generates a theoretical 11.7 wt % hydrogen, has a predicted enthalpy of reaction of 66.2 kJ/mole $H_2$ and a predicted equilibrium temperature of 388° C. at 1 bar.

The hydrogen storage material may have a theoretical hydrogen content of greater than about 5 wt %, or in another embodiment greater than 7 wt %. In some embodiments, the hydrogen storage material has a theoretical hydrogen content of greater than 9 wt %. As recognized by one of skill in the art, the theoretical yield is rarely observed empirically, and actual yields are often less than the predicted theoretical yield.

Also as appreciated by one of skill in the art, the hydrogen storage material may initially comprise the dehydrogenated products of the above reactions, and may be subsequently hydrogenated, thereby cyclically releasing and storing hydrogen in accordance with the invention. For example, in one embodiment, the starting materials comprise LiH and $MgB_2$. The starting materials are exposed to hydrogen gas, where they transform to $LiBH_4$ and $MgH_2$ in a hydrogenated state, and are subsequently able to reversibly release and absorb hydrogen, as previously described above.

In various embodiments of the invention, a catalyst is employed to enhance the reaction kinetics. Such catalysts are well known to one of skill in the art. Catalysts that may be useful with the invention comprise an element from the following non-limiting list: Fe, Ni, Co, Pt, Pd, Sr, and compounds and mixtures thereof. Suitable catalyst compounds include $TiH_2$, $TiH_x$, $TiF_3$, $TiCl_2$, $TiCl_4$, $TiF_4$, $VCl_3$, $VF_3$, and $VH_x$. The catalyst is generally added to either one of the hydrogen storage starting materials or to both of the hydrogen storage materials. The materials may be milled to achieve a desirable particle size and homogeneous mixing. However, the invention also contemplates processing the catalyst by precipitation from solution, vapor phase deposition, chemical transport, or sputter deposition, inter alia. In various embodiments catalyst concentrations in the hydrogen storage material system are from between about 0.1 to about 10 mole %.

In various embodiments, the invention provides a method of reversibly storing hydrogen where hydrogen is released from starting materials while in the presence of a hydrogen. In such embodiments, the hydrogen generation reaction, which occurs between a stable hydride and a destabilizing hydride under a hydrogen atmosphere, is substantially reversible at industrially practicable pressure and temperature conditions Thus, in various embodiments, the reacting of a stable hydride and a destabilizing hydride to release hydrogen is conducted in a hydrogen atmosphere comprising substantially all hydrogen gas (the hydrogen gas may contain a small level of impurities that do not detrimentally impact the reaction), one or more of the reaction products formed in the reaction are capable of reforming the starting materials upon exposure to hydrogen (i.e., the dehydrogenation reaction is reversible). In various embodiments, the minimum hydrogen pressure of the hydrogen atmosphere is at least about 10 atm (approximately about 1000 kPa); at least about 8 atm (approximately about 800 kPa); at least about 6 atm (approximately about 600 kPa); at least about 5 atm (approximately about 500 kPa); at least about 4 atm (approximately about 400 kPa); at least about 3 atm (approximately about 300 kPa); at least about 2 atm (approximately about 200 kPa); or at least about 1 atm (approximately about 100 kPa). An example of an embodiment where the reversible hydrogen release reaction may be conducted in the presence of a hydrogen atmosphere is where a stable hydride is lithium borohydride ($LiBH_4$) and a destabilizing hydride is magnesium hydride ($MgH_2$). A hydrogen atmosphere appears to facilitate the formation of the more readily reversible products LiH and $MgB_2$ (in addition to hydrogen), rather than the alternative products of Mg and B metals, as will be described further in Example 3 below.

EXAMPLE 1

In a first experiment conducted according to a method of making a hydrogen storage compound according to one embodiment of the invention, a mixture of $LiBH_4$ and $MgH_2$ is prepared having a molar ratio of 2:1 that reacts according to the above described chemical reaction formula. The $LiBH_4$ is commercially available from Lancaster Synthesis, Inc. of Windham, N.H. (and is specified to be ≧95% purity) and the $MgH_2$ is commercially available at 95% purity from Gelest. The starting powders are mixed in the molar ratio 2 $LiBH_4$:1 $MgH_2$ with 2 mole % of a catalyst ($TiCl_3$) added during milling. The starting materials weigh 1.2 grams and are added and sealed into a 80 $cm^3$ hardened steel ball mill vessel under an argon (Ar) inert atmosphere. Thirty chrome-steel mill balls having a 7 mm diameter are placed in the vessel with the powder prior to sealing. The material is then high-energy ball milled for at least one hour in a Fritsch Pulversette 6 planetary mill at 400 rpm. The average particle size diameter of the compound(s) remaining in the mill may be approximately 5 μm to about 15 μm.

Figure 2:
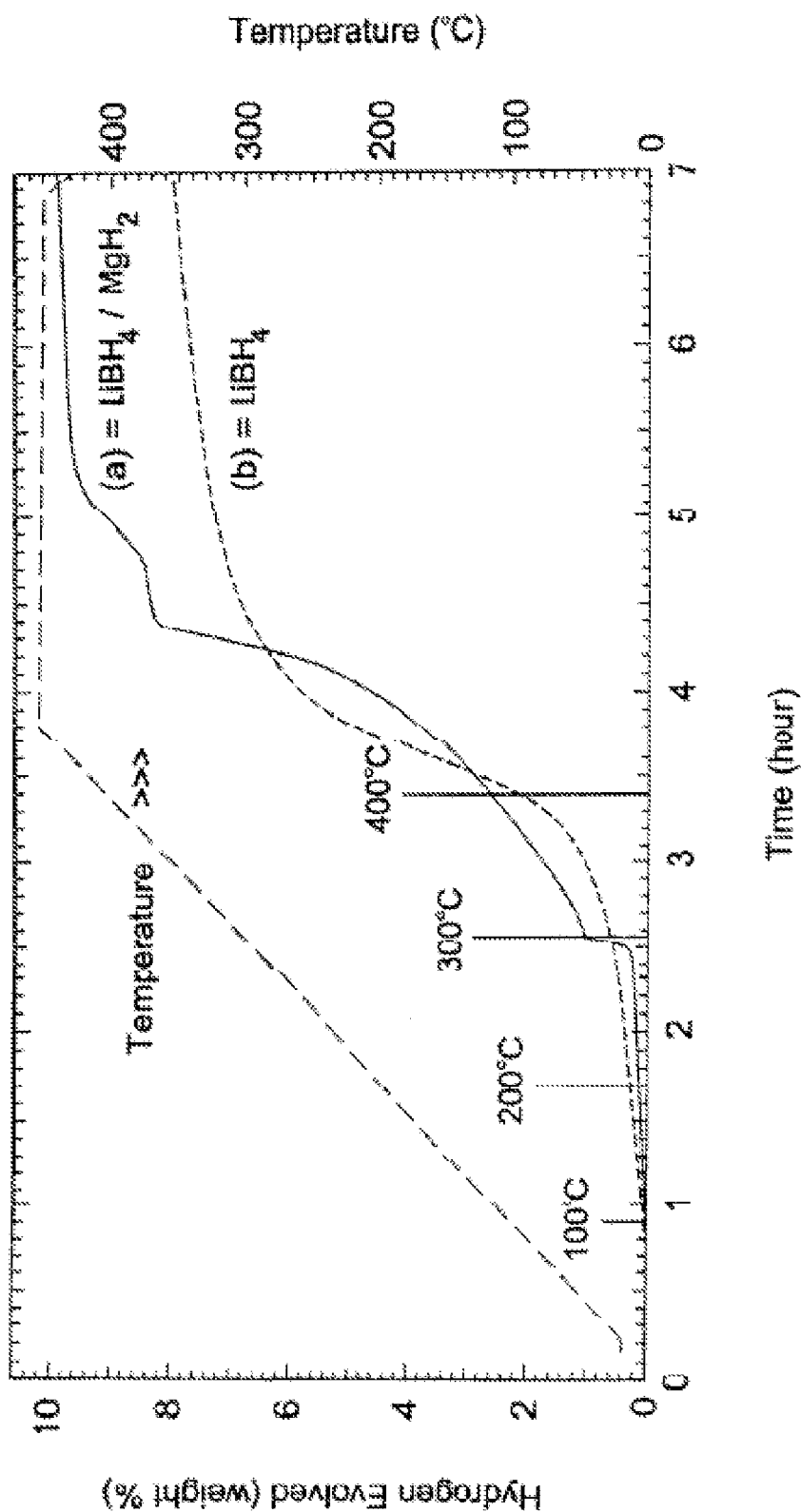
FIG. 2 shows a comparative volumetric analysis in a custom Sievert's apparatus showing dehydrogenation of one embodiment of a hydrogen storage material of the invention ($LiBH_4$ and $MgH_2$) versus time and the weight loss of a prior art stable hydride ($LiBH_4$) versus time as temperature is increased to 450° C. and then held constant.

FIG. 2 shows a volumetric analysis obtained with a mass spectrometer monitoring the exhaust gas from the Sievert's apparatus. FIG. 2 shows hydrogen release by weight loss as a function of time for a sample of the milled hydrogen storage composition comprising $LiBH_4$ and $MgH_2$ prepared in accordance with Example 1. FIG. 2 also depicts a plot of the hydrogen release by weight loss as a function of time for a sample of milled $LiBH_4$ prepared in accordance with the procedure described above, however without any destabilizing hydride (e.g., $MgH_2$). The $LiBH_4$ has a $TiCl_3$ catalyst added, as well. Each sample is continuously heated at a rate of 2° C. per minute up to 450° C. (represented by the dashed line). Curve "a" represents the hydrogen storage material of the invention having the $LiBH_4$ and $MgH_2$, whereas curve "b" represents $LiBH_4$ alone in accordance with the prior art. Although the behavior of the $LiBH_4$ and $MgH_2$ hydrogen storage material is complex, nearly 10 wt % of hydrogen is generated from the hydrogen storage material (the wt % of the catalyst is not included). In comparison, the $LiBH_4$ only produces less than 8 wt % hydrogen (not including the catalyst). Thus, the hydrogen storage material prepared in accordance with the invention demonstrates improved hydrogen release over the prior art.

Figure 3:
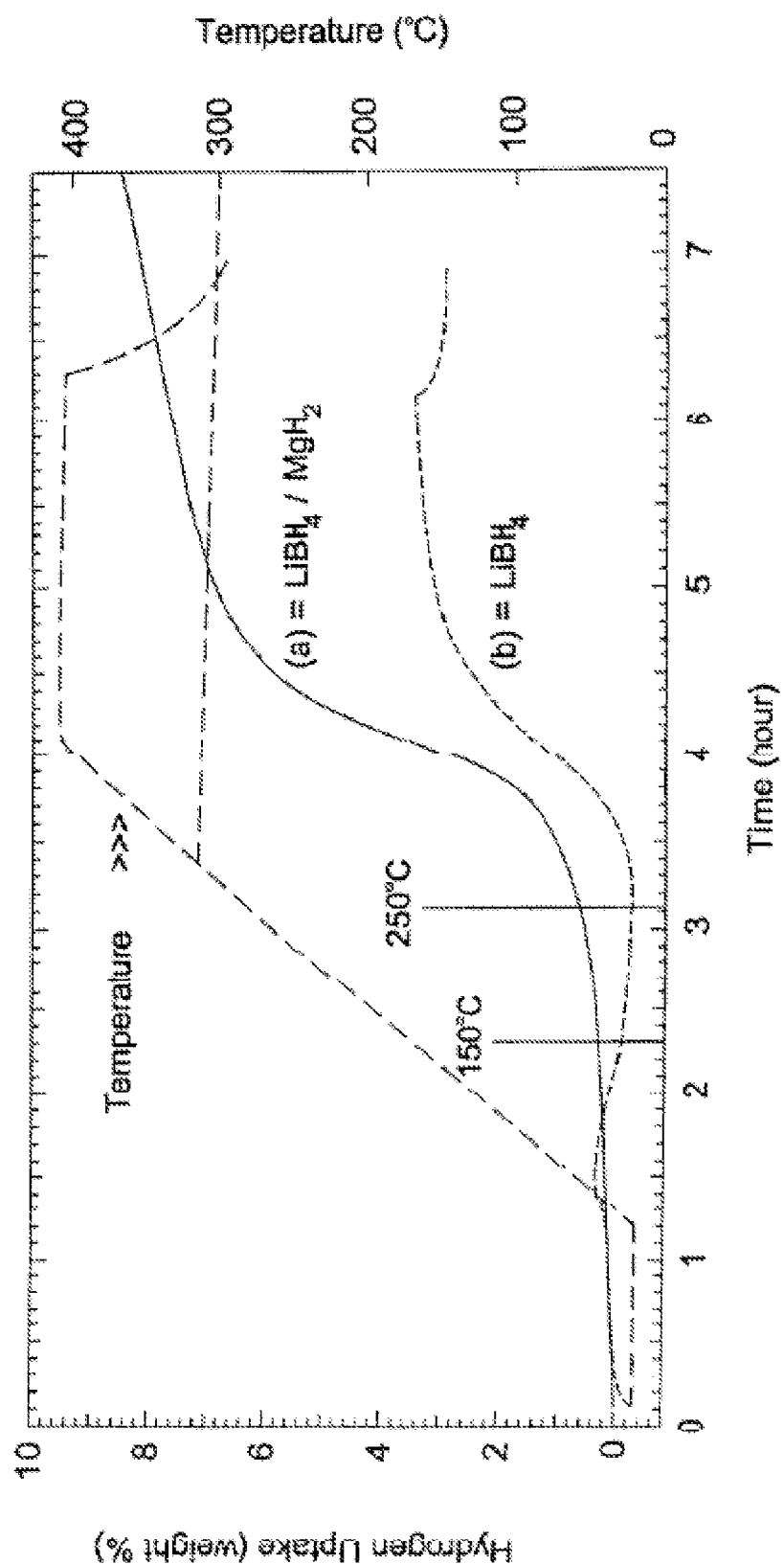
FIG. 3 shows a comparative volumetric analysis of hydrogen absorption of an embodiment of a hydrogen storage material of the invention ($LiBH_4$ and $MgH_2$) as compared to a prior art stable hydride ($LiBH_4$), where heat is applied at a constant rate of 120° C. per hour or 2° C. per minute.

Similarly, FIG. 3 shows hydrogen absorption behavior of the dehydrogenated mixture of the sample prepared in accordance with Example 1. A dehydrogenated sample of pure $LiBH_4$ with 0.1 mole $TiCl_3$ catalyst is also provided for comparison. For the Example 1 sample, the $LiBH_4$ and $MgH_2$ is heated at 2° C. per minute up to a temperature of 300° C. where it is held constant. The prior art sample of $LiBH_4$ is heated at a rate of 2° C. per minute up to a temperature of 400° C. where it is held. As can be observed from FIG. 3, at 300° C., the $LiBH_4$ and $MgH_2$ mixture represented by curve "a" absorbs greater than 8 wt % hydrogen. In contrast, even at 400° C., the pure $LiBH_4$ represented by curve "b" absorbs less than 4 wt % hydrogen. Thus, at lower temperatures, the $LiBH_4$ and $MgH_2$ mixture of the invention having a stable hydride and a destabilizing hydride demonstrates good hydrogen absorption at lower temperatures, as compared to the prior art stable hydride alone.

Figure 4:
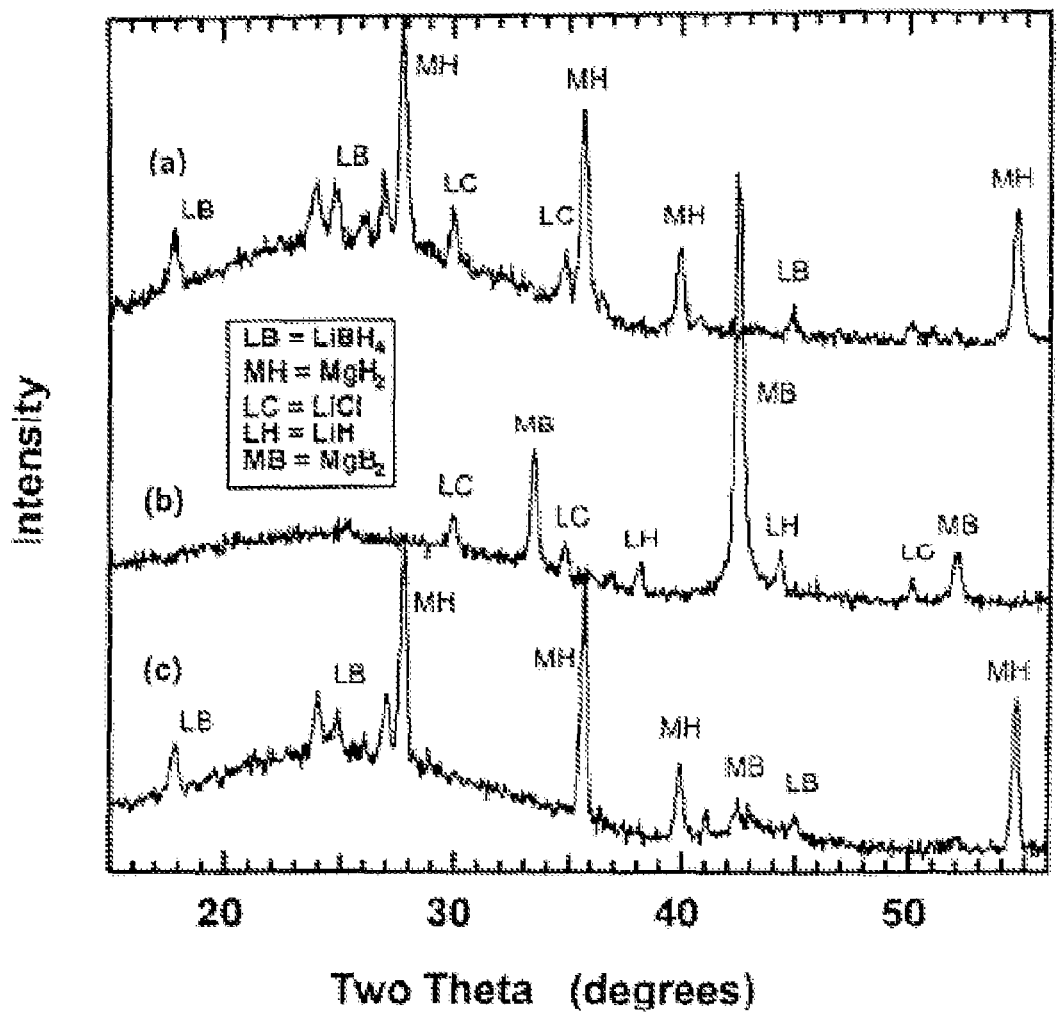
FIG. 4 is an x-ray diffraction pattern of a hydrogen storage material according to one embodiment of the invention ($LiBH_4$ and $MgH_2$) taken after milling a stable hydride with a destabilizing hydride (curve a), after dehydrogenation (curve b), and after rehydrogenation (curve c)

FIG. 4 shows an x-ray diffraction pattern of a sample prepared in accordance with Example 1. In FIG. 4, "LB" represents $LiBH_4$, "MH" represents $MgH_2$, "MB" represents, $MgB_2$, and "LC" represents $LiCl_3$. Curve "a" is taken after mechanical milling of $LiBH_4$ and $MgH_2$ together and shows that milling produces a physical mixture with no reaction products between the stable hydride and destabilizing hydride. However, as can be seen, a small concentration of lithium chloride is produced from a reaction of $TiCl_3$ with $LiBH_4$ which may occur during milling. No diffraction from any species containing Ti was observed. After dehydrogenation occurs (represented by curve "b") the byproducts $MgB_2$ and LiH are produced. After rehydrogenation at 350° C. (represented by curve "c") the pattern shows where $LiBH_4$ and $MgH_2$ reform while the diffraction peaks from LiCl disappear. The quartet of peaks around 25° two theta together with the peak at 18° distinctly identify $LiBH_4$ and demonstrate its reversible formation. This data confirms that the $LiBH_4$/$MgH_2$ hydrogen storage material system is reversible.

EXAMPLE 2

In a second experiment, approximately 1.2 g mixtures of LiH+½ $MgB_2$ (the reaction products) +0.03 mole $TiCl_3$ (catalyst) were mechanically milled for 1 hr as described previously in the first experiment.

Figure 5:
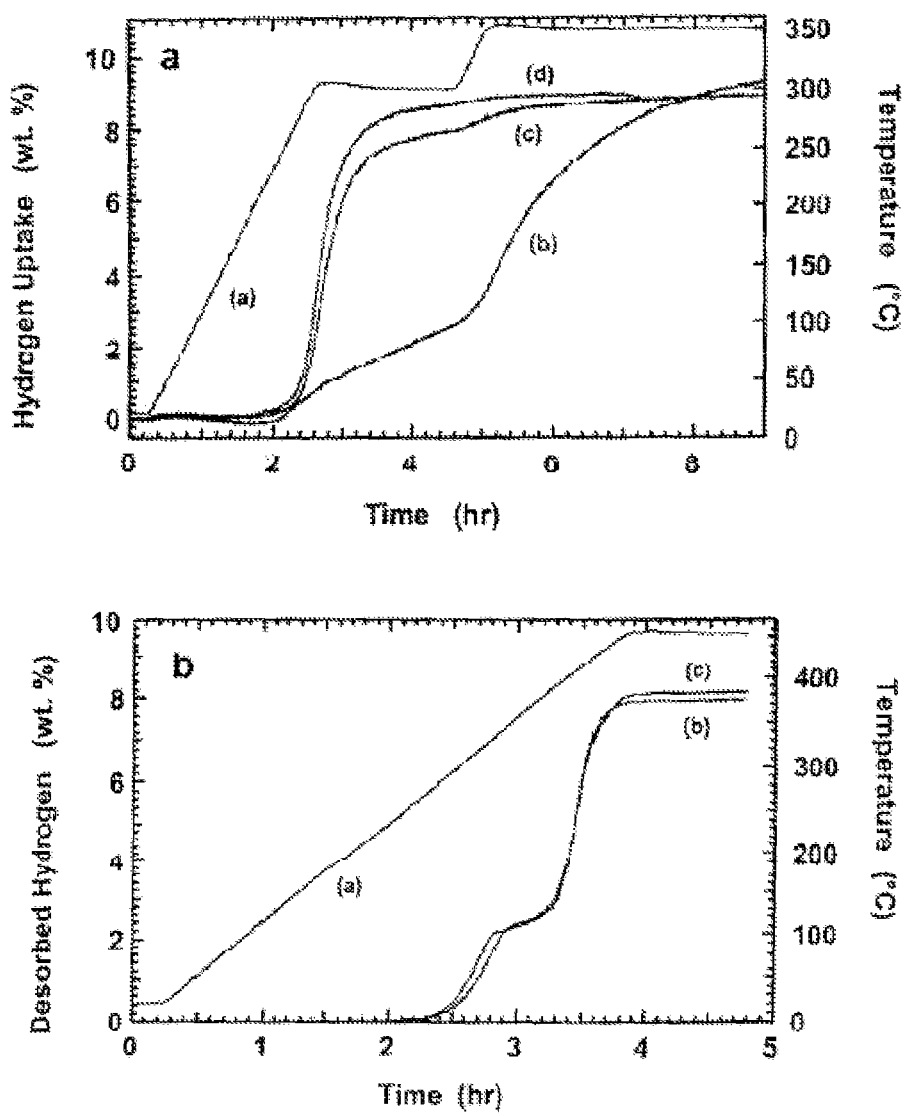
FIG. 5 is another volumetric analysis showing cyclic dehydrogenation and rehydrogenation of an embodiment of a hydrogen storage material of the invention (LiH and $MgB_2$)

FIG. 5 shows hydrogenation and dehydrogenation of a sample prepared in accordance with Example 2. The temperature ramp dehydrogenation/hydrogenation and isotherm measurements are performed in two custom Sievert's apparatus. The system was pumped using an oilfree pumping station (the Tribodyn 100/120-HVP model available from Danielson Associates). The pressure at the sample is determined by replacing the sample container with an ionization gauge and measuring the pressure. After pumping overnight, a pressure of $1 \times 10^{-6}$ Torr ($1.3 \times 10^{-4}$ Pa) can be obtained. Hydrogen pressures are measured using low-range (0-100 psia or approximately $7.0 \times 10^2$ kPa) and high-range (0-3000 psia or approximately $2.1 \times 10^4$ kPa) capacitance manometers at selected temperatures over the range from 75° C. to 575° C.

During heating at 2° C./min, hydrogen uptake from an initial hydrogen pressure of 100 bar begins at 230° C. to 250° C. For the initial cycle, hydrogenation is relatively slow, with a hydrogen uptake of 2.5 wt % hydrogen after 2 hr at 300° C. Upon heating to 350° C. additional hydrogen uptake occurs reaching >9 wt %. On the second and third cycles, the uptake is faster and 9 wt % uptake occurs in approximately 2 hr at 300° C. Desorption into an initially evacuated volume begins at about 270° C. Two desorption steps appear at 270° C. to 340° C. and 380° C. to 440° C., respectively. Upon heating to 450° C. desorption of 8 wt % hydrogen is obtained. The desorption kinetics for the first two cycles are nearly identical. Final pressures of 5 to 6 bar may be limited by equilibrium (see FIG. 6 below). Mass spectrometric analysis of the desorbed gas using a residual gas analyzer (RGA) attached to the Sievert's apparatus showed only hydrogen released, although the effluent may contain low concentrations of species such as $B_2H_6$ or HCl.

Figure 6:
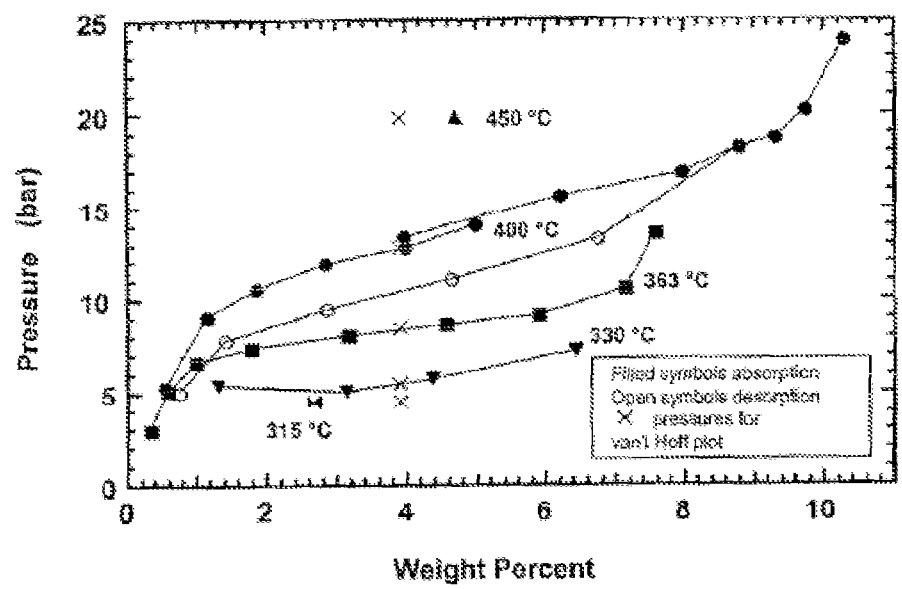
FIG. 6 shows absorption and desorption isotherms for multiple samples of hydrogen storage materials of an embodiment of the invention (LiH and $MgB_2$) where the filled symbols indicate absorption and the open symbols at 400° C. indicate desorption.

Absorption and desorption isotherms for the sample prepared in accordance with Example 2 are shown in FIG. 6. Isotherm measurements are performed manually in the same Sievert's apparatus used for the temperature ramp experiments. Absorption isotherms are shown between 315° C. and 450° C. (specifically at 330° C., 363° C., 400° C., and 450° C.) and a desorption isotherm is shown at 400° C. The isotherms show sloping plateaus from 2 to 8 wt % with capacities of approximately 10 wt %. Equilibrium pressures vary from 4.5 bar at 315° C. to 19 bar at 450° C. Absorption and desorption isotherms obtained at 400° C. display a hysteresis of 2 to 3 bar.

Figure 7:
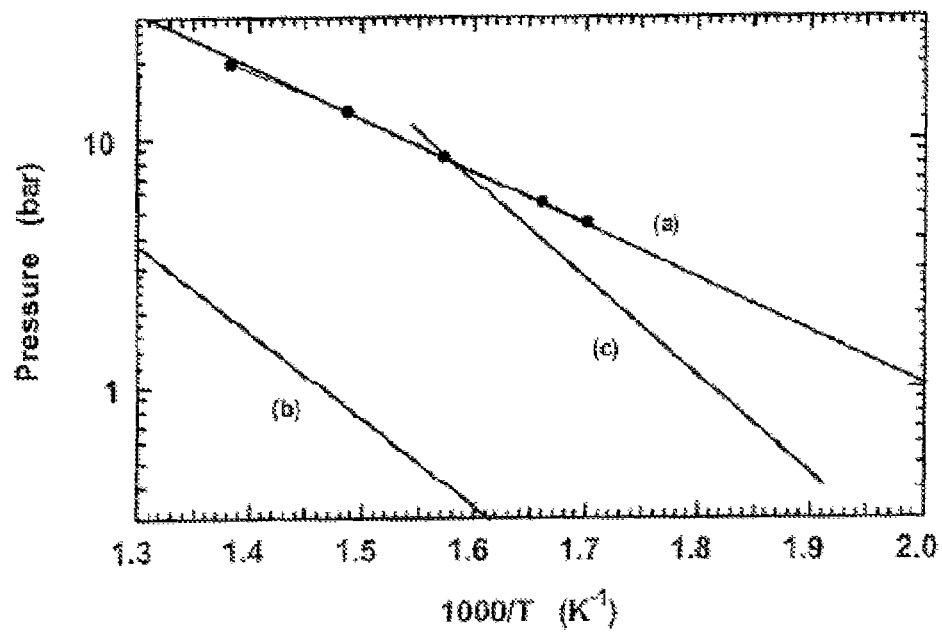
FIG. 7 is a van't Hoff plot showing equilibrium pressures obtained from absorption isotherms corresponding to the 4 weight % data of FIG. 6, indicated therein by the "X" mark designations.

FIG. 7 is a preliminary van't Hoff plot (logarithm of the equilibrium pressure versus the inverse of the absolute temperature) using absorption equilibrium pressures at 4 wt %

(see FIG. 6). Curve "a" of FIG. 7 shows equilibrium pressures obtained from absorption isotherms at 4 wt %. From 315° C. to 400° C. the behavior is linear with a dehydrogenation enthalpy of 40.5 kJ/mol-H$_2$, an equilibrium pressure of 1 bar at 225° C., and an entropy of 81.3 kJ/K-mol-H$_2$. At 450° C. (1000/T=1.38) the equilibrium pressure is lower than the pressure predicted based on an extrapolation of the linear behavior at lower temperatures.

In FIG. 7, curve "b" shows an estimate of the behavior for dehydrogenation of LiBH$_4$ to LiH+B. Curve "c" shows equilibrium pressures for MgH$_2$/Mg obtained from the IEA/DOE/SNL database. The enthalpy for the LiBH$_4$/LiH+B system is estimated to be +67 kJ/mol-H$_2$. Compared with pure LiBH$_4$, the hydrogenation/dehydrogenation enthalpy for the LiBH$_4$+ ½ MgH$_2$ system is lower by 25 kJ/mol-H$_2$ and at 400° C. the equilibrium pressure is increased from approximately 1 to 12 bar. Alternatively, extrapolating the linear behavior gives a temperature of 225° C. for an equilibrium hydrogen pressure of 1 bar. Overall, the equilibrium pressure indicates that addition of MgH$_2$ significantly destabilizes LiBH$_4$ for hydrogen storage.

The equilibrium pressure behavior for the LiBH$_4$+½ MgH$_2$ system crosses the curve for MgH$_2$/Mg at approximately 360° C. (1000/T=1.57). It appears that at temperatures below 360° C. the equilibrium pressures are greater than those for pure MgH$_2$. Thus, in addition to LiBH$_4$, the MgH$_2$ is also destabilized. In this region the combined LiBH$_4$ and MgH$_2$ system has equilibrium pressures higher than either individual component. Above 360° C., the equilibrium pressures, obtained from the isotherms at 4 wt %, are below the equilibrium pressures for MgH$_2$/Mg. Under these conditions, it is believed that the system reacts in an alternate reaction mechanism:

$$\text{LiBH}_4 + \frac{1}{2}\text{Mg} \leftrightarrow \text{LiH} + \frac{1}{2}\text{MgB}_2 + \frac{3}{2}\text{H}_2 \quad \text{(Reaction 8)}$$

Because hydrogenation of Mg is exothermic, the enthalpy for the alternate reaction (Reaction 8) should be less than the enthalpy for the reaction designated as Reaction 1 previously described above for the dehydrogenation reaction of LiBH$_4$+ ½ MgH$_2$. Consequently, the variation of equilibrium pressure with temperature should display a lower enthalpy, i.e., a lower slope, above approximately 360° C. The measured equilibrium pressure at 450° C. is lower than the pressure extrapolated from lower temperatures. While not wishing to be bound by any particular theory, it is believed that this data point may indicate a transition from Reaction 1 at temperatures below about 360° C. to the alternate reaction (Reaction 8) at higher temperatures. Although two plateaus have not been observed in the isotherm data, the temperature ramp desorption measurements show two desorption steps which likely correspond to dehydrogenation of MgH$_2$ followed by reaction of Mg with LiBH$_4$ to form MgB$_2$. In accordance with one embodiment of the invention, the addition of MgH$_2$ to LiBH$_4$ yields a reversible, destabilized hydrogen storage material system with an actual hydrogen capacity of approximately 8 to 10 wt %. The hydrogenation/dehydrogenation enthalpy is reduced by 25 kJ/mol-H$_2$, as compared with pure LiBH$_4$ and the temperature for an equilibrium pressure of 1 bar is estimated to be 225° C.

EXAMPLE 3

In a third experiment, a mixture of LiBH$_4$ and MgH$_2$ is prepared having a molar ratio of 2:1 with a TiCl$_3$ catalyst at 2 mole %, in the same manner as that described in Example 1 above. The ball-milled samples are dehydrogenated under two different atmospheric conditions to demonstrate the effect of hydrogen atmosphere on reaction products.

Figure 8:
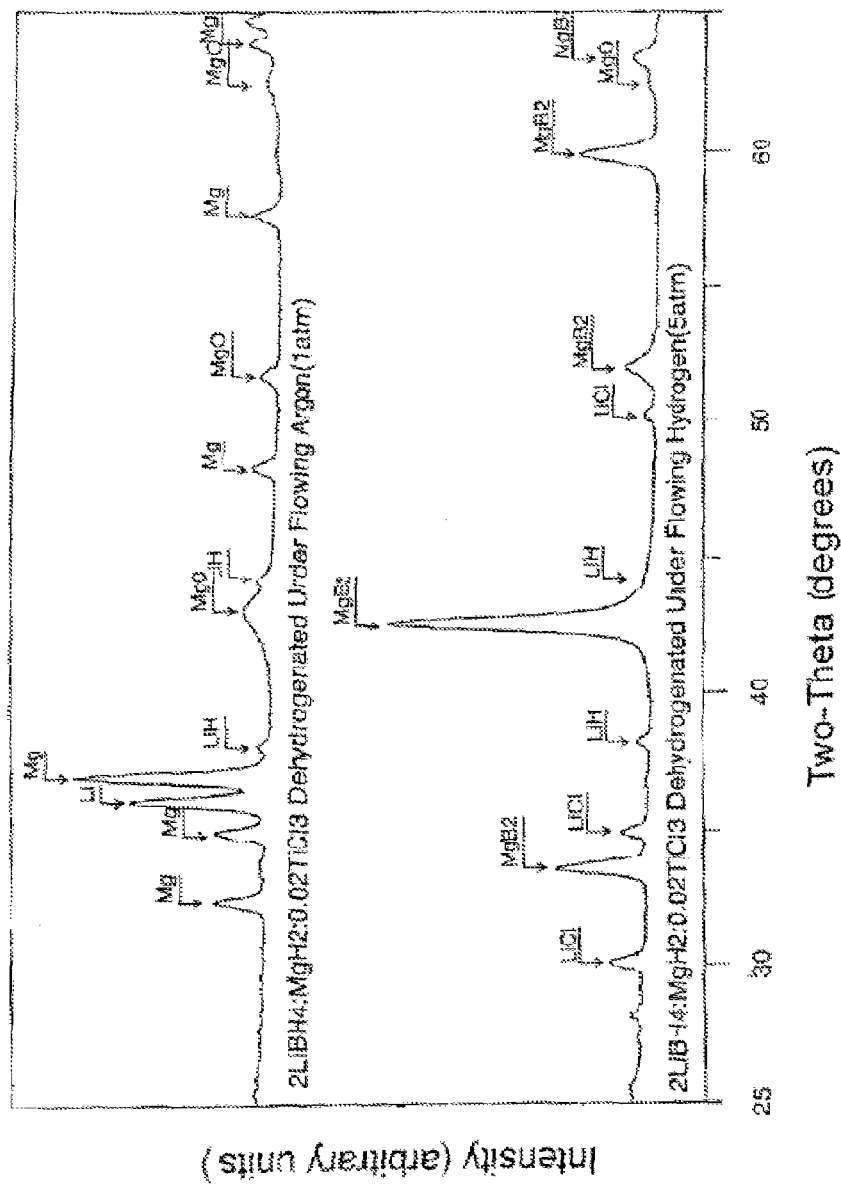
FIG. 8 shows an x-ray diffraction (XRD) graph showing dehydrogenation of a stable hydride and a destabilizing hydride under a hydrogen atmosphere and an argon atmosphere according to one embodiment of the invention.

FIG. 8 shows x-ray diffraction (XRD) data for the two different dehydrogenation scenarios. Scan A shows an XRD for a material dehydrogenated by heating to 400° C. under flowing hydrogen at a pressure of 5 atm (approximately 500 kPa). Scan A shows that the reaction products include MgB$_2$, but no detectable quantities of Mg metal were produced. The sample in Scan B was dehydrogenated by heating to 400° C. under a flowing argon atmosphere at 1 atm (100 kPa). The XRD pattern in Scan B shows that Mg metal was formed as a reaction product, but no detectable amounts of MgB$_2$ are formed. As such, in various embodiments of the invention, where it is desirable to have reversibility of the hydrogen generation reaction, the dehydrogenation reaction of the stable hydride with the destabilizing hydride may be conducted in the presence of hydrogen, for example in a hydrogen atmosphere, to enable formation of reaction products that are capable of being readily regenerated by exposure to hydrogen gas (e.g., MgB$_2$ rather than elemental Mg and B).

EXAMPLE 4

In a fourth experiment according to one embodiment of the invention, a mixture of LiBH$_4$ and CaH$_2$ is prepared having a molar ratio of 6:1 that reacts according to Reaction 7 described above. The LiBH$_4$ is commercially available from Aldrich Chemicals of Milwaukee, Wis. (and is specified to be ≧95% purity), and the CaH$_2$ is commercially available at 99.9% purity also from Aldrich. The starting powders are mixed in the molar ratio 6 LiBH$_4$:1 CaH$_2$ and ball milled for one hour in an SPEX 8000 Mixer/Mill. Prior to milling, 0.25 mole of a catalyst (TiCl$_3$) is added.

Figure 9A:
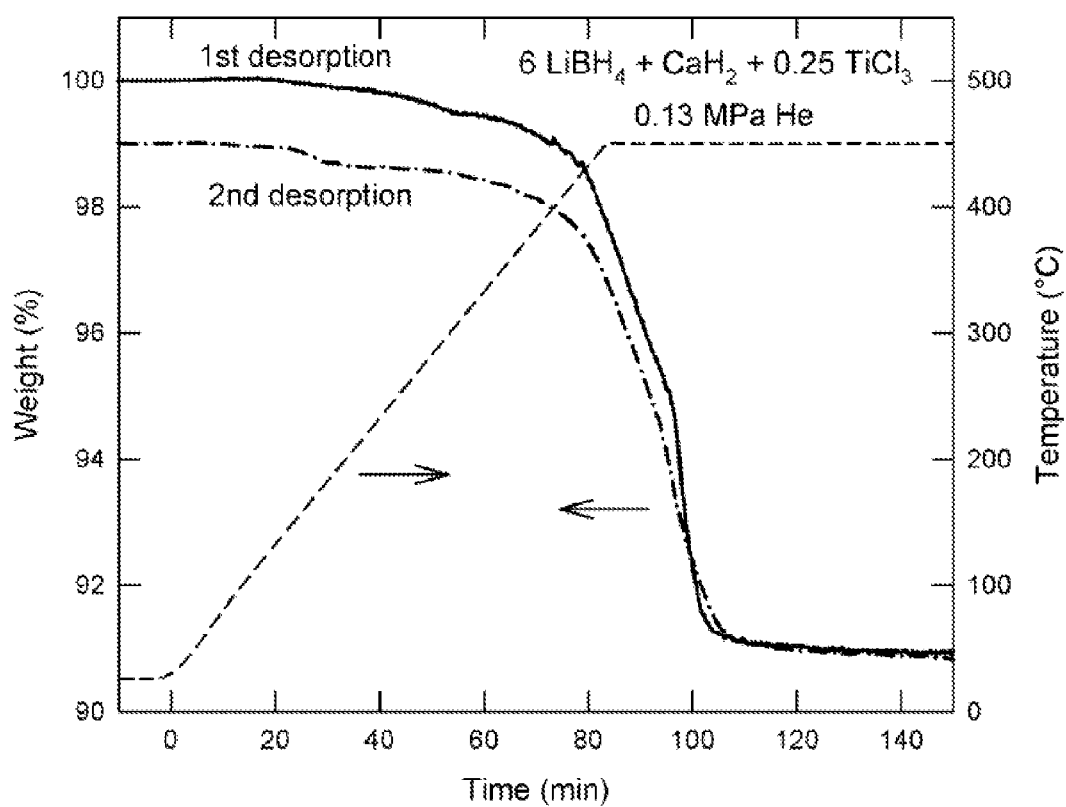
FIG. 9A is a gravimetric analysis performed in a commercial thermogravimetric analyzer showing the first (solid line) and second (dash-dot line) dehydrogenation of one embodiment of a hydrogen storage material of the invention ($LiBH_4$ and $CaH_2$) versus time during heating according to the shown temperature profile (dashed line).
Figure 9B:
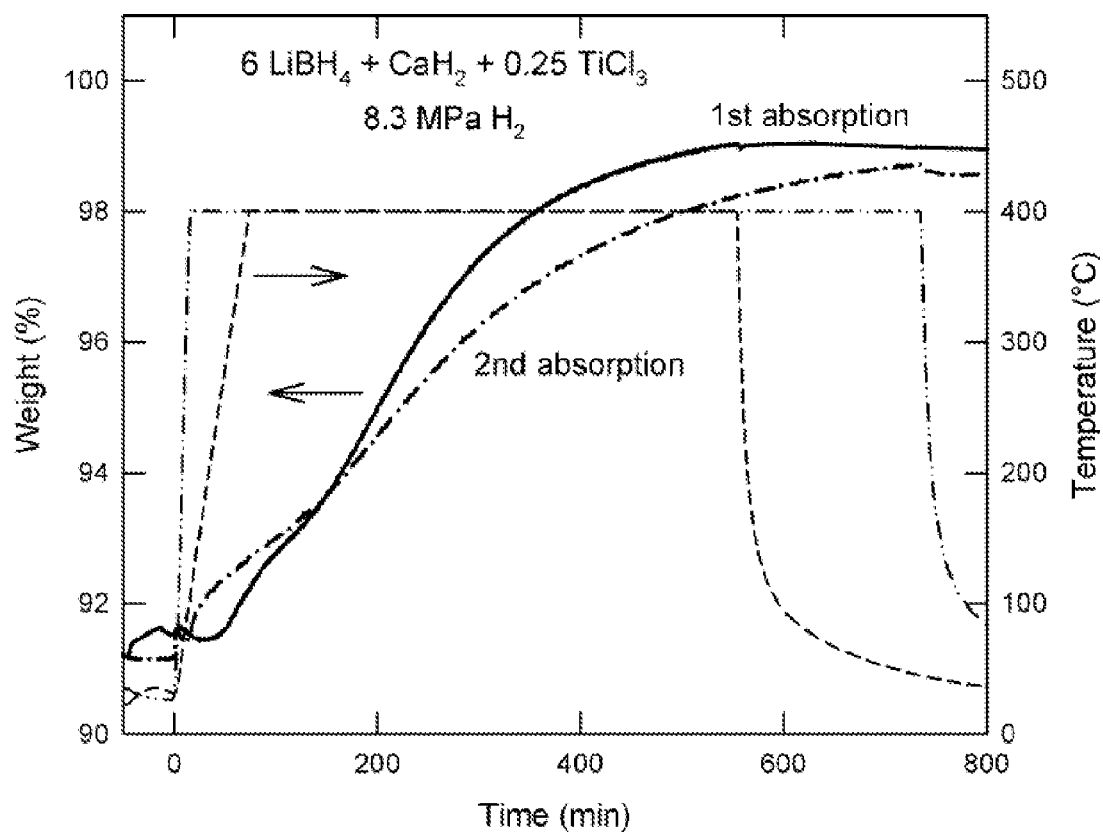
FIG. 9B is a gravimetric analysis of the first (solid line) and second (dash-dot line) hydrogen absorption where the first absorption was conducted after the first desorption but prior to the second desorption of FIG. 9A, and the second absorption was conducted subsequent to the second desorption of FIG. 9A.
Figure 10A:
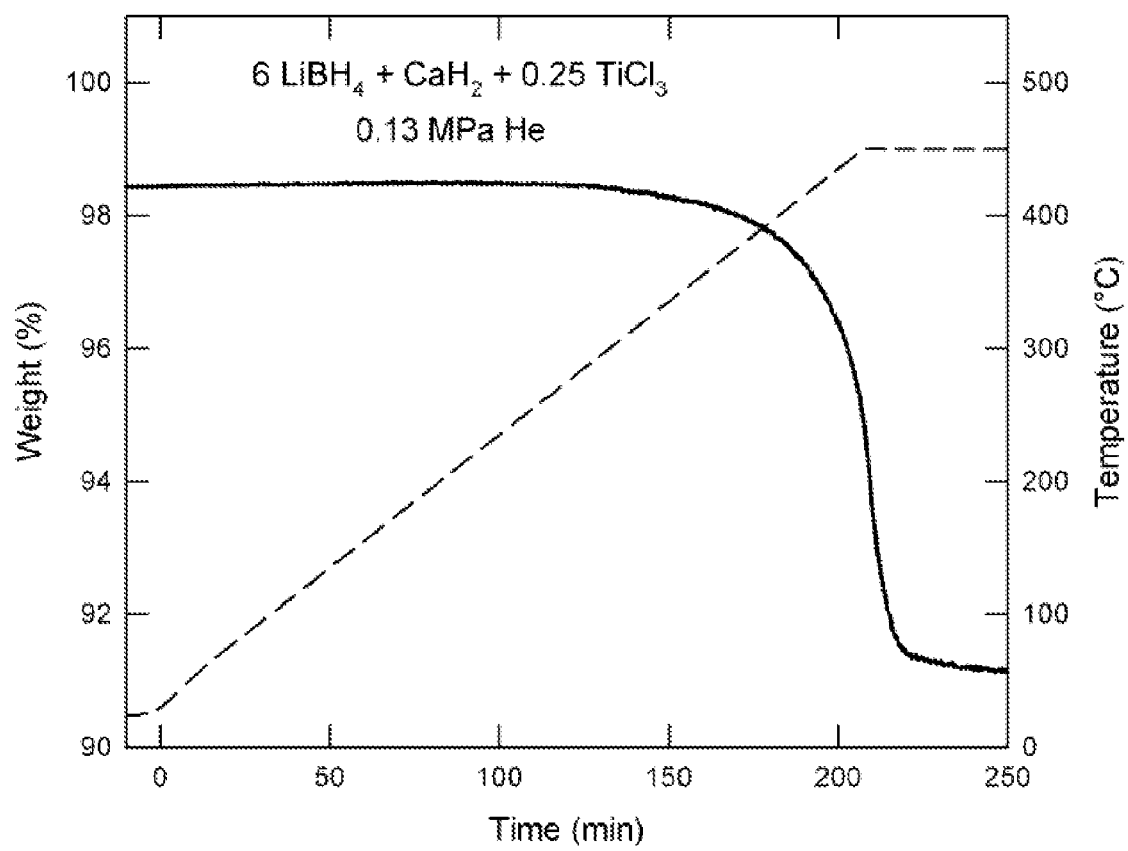
FIG. 10A is a gravimetric analysis of the third desorption after the second absorption of FIG. 9B.
Figure 10B:
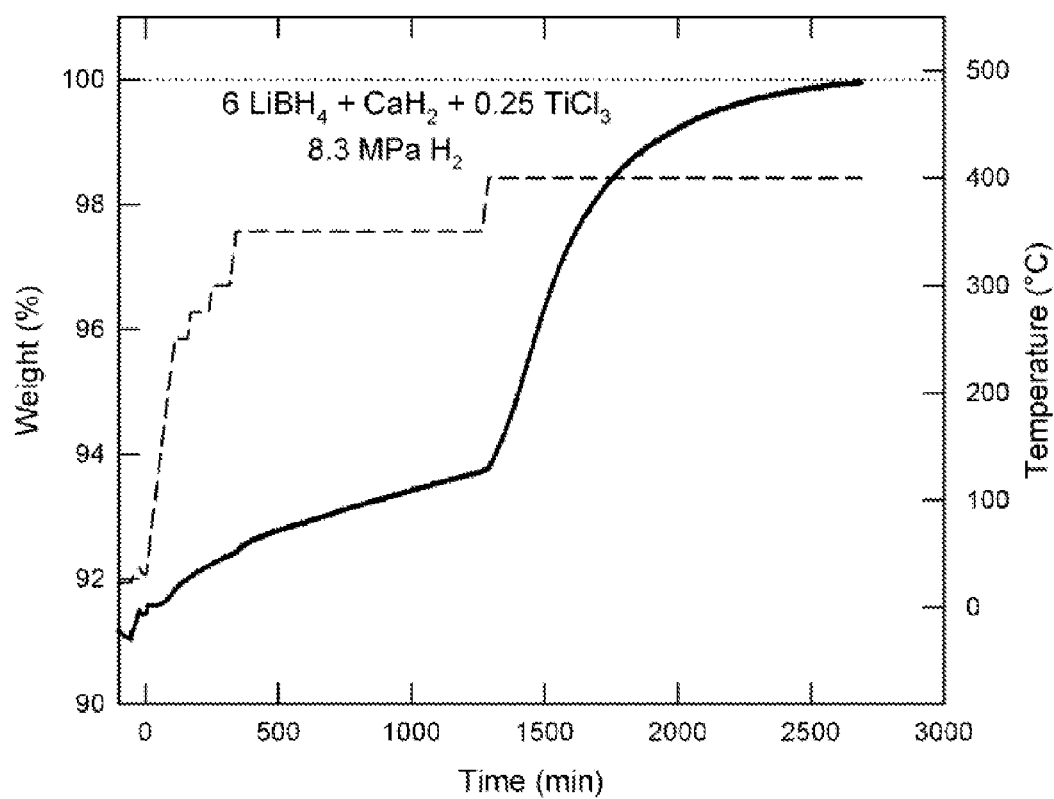
FIG. 10B is a gravimetric analysis of the third absorption after the third desorption of FIG. 10A.

FIGS. 9 and 10 show dehydrogenation and hydrogenation of a sample prepared in accordance with Example 4. Hydrogen desorption and absorption were measured gravimetrically by monitoring the weight loss and gain, respectively, in a Cahn Model 2151 high pressure thermogravimetric analyzer, available from Cahn Instruments. FIG. 9A shows the first desorption (solid line) and second desorption (dash-dot line) of the sample according to one embodiment of the invention versus time during heating according to the shown temperature profile (dashed line). FIG. 9B shows the subsequent first absorption (solid line) and second absorption (dash-dot line) between and following the first and second desorptions, respectively. Together, FIGS. 9A and 9B correspond to two cycles of dehydrogenation and rehydrogenation. FIG. 10A shows the third desorption after the second absorption of FIG. 9B, and FIG. 10B shows the third absorption after the third desorption of FIG. 10A.

Figure 11:
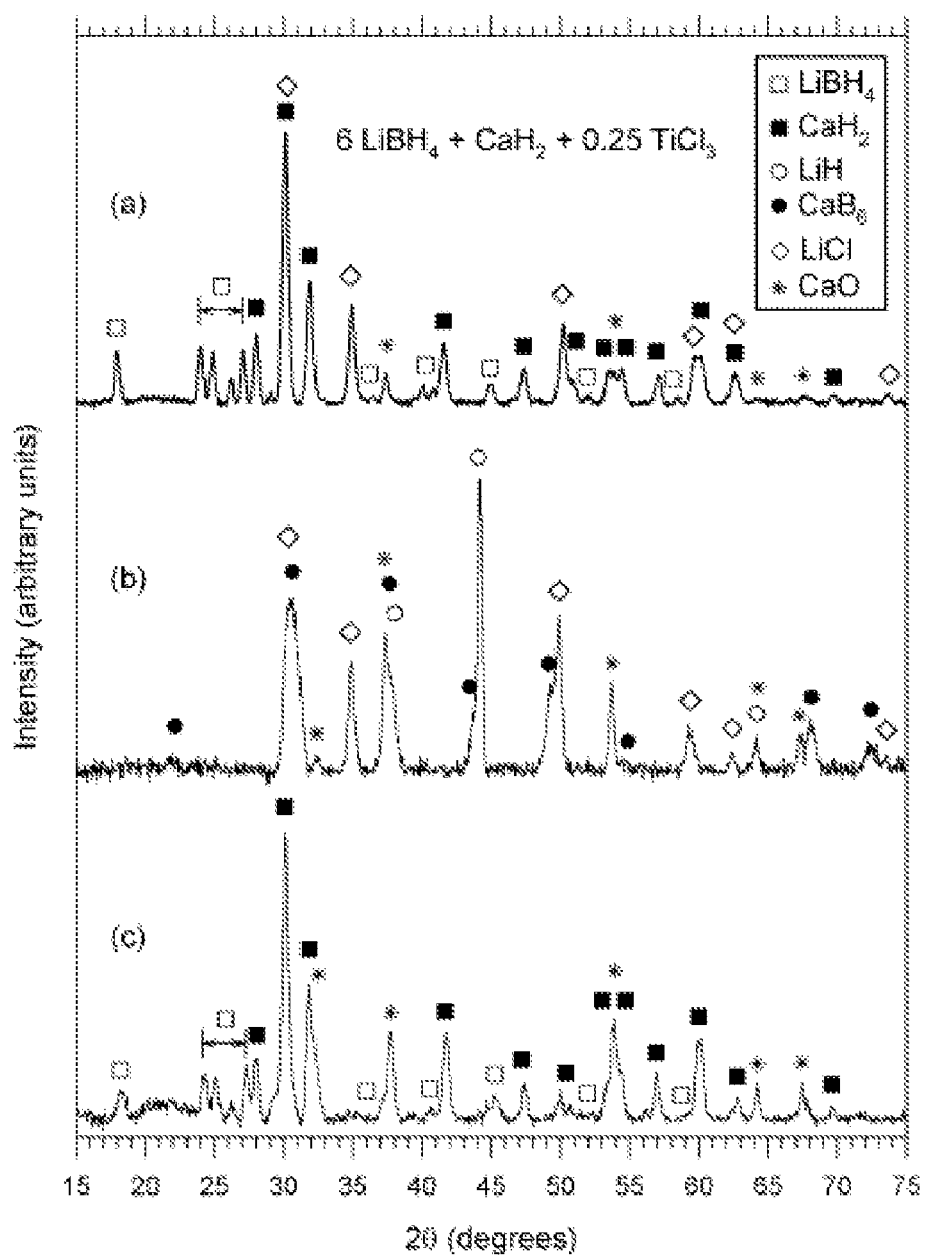
FIG. 11 is an x-ray diffraction pattern of a hydrogen storage material according to one embodiment of the invention ($LiBH_4$ and $CaH_2$) taken after milling a stable hydride with a destabilizing hydride (panel a), after the first desorption of FIG. 9A (panel b), and after the third hydrogenation of FIG. 10B (panel c).

FIG. 11 is x-ray diffraction (XRD) patterns of a sample prepared in accordance with Example 4. Panel (a) of FIG. 11 shows the XRD pattern of the initial mixture, demonstrating that the as-prepared sample consists of a mixture of LiBH$_4$, CaH$_2$, LiCl (from the reaction of TiCl$_3$ with Li from the LiBH$_4$), and CaO (an impurity not deliberately added, but which is an impurity in the commercial CaH$_2$ used—its only effect is as a diluant). Panel (b) of FIG. 11 shows the XRD pattern after dehydrogenation (after the desorption of FIG. 9A). Diffraction lines from LiH and CaB$_6$ are clearly detected, whereas those of LiBH$_4$ and CaH$_2$ comprising the starting material before dehydrogenation are no longer observed. Finally, panel (c) of FIG. 11 shows the XRD pattern after the third rehydrogenation (of FIG. 10B), and it consists of a mixture of LiBH$_4$ and CaH$_2$, along with CaO impurity.

This demonstrates the reversible nature of the reaction. The total observed hydrogen cycling amount is 9.1 wt %. Dilution by the $TiCl_3$ content (0.25 moles $TiCl_3$ per 6 moles of $LiBH_4$) reduces the expected total cyclable hydrogen content from 11.7 wt % to 9.5 wt %, and further dilution by the CaO impurity content (whose quantity is not known) may further reduce the cyclable hydrogen content. The observed 9.1% reversible storage thus represents nearly complete hydrogen desorption and absorption according to Reaction 7 described above.

Thus, the hydrogen storage materials according to the invention provide a stable reversible solid phase hydrogen storage composition material, which is especially advantageous in mobile fuel cell applications. The reaction to generate hydrogen is readily controlled by temperature and pressure, and the required energy input is significantly reduced to increase efficiency of the overall system, while the hydrogen storage capacity is substantially increased. The hydrogen storage material system according to various embodiments of the invention provides a stable, safe, and energy efficient means to store hydrogen for prolonged periods while enabling both hydrogen release and reversible reaction at moderate conditions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of reversibly storing hydrogen, the method comprising:
   providing a mixture comprising a stable hydrogen storage hydride and a destabilizing hydride, wherein said stable hydride is capable of releasing hydrogen at a first energy level ($E_1$); and
   reacting said stable hydride with said destabilizing hydride to provide at least a first hydrogen storage material and to release hydrogen at a second energy level ($E_2$); wherein $E_2$ is less than $E_1$, and exposing the first hydrogen storage material to hydrogen to form the stable hydrogen storage hydride and the destabilizing hydride.

2. The method of claim 1 wherein said reacting is slightly endothermic.

3. The method of claim 1 wherein $E_2$ is at least about 10% less than $E_1$.

4. The method of claim 1 wherein $E_2$ is at least about 20% less than $E_1$.

5. The method of claim 1 wherein $E_2$ is at least about 30% less than $E_1$.

6. The method of claim 1 wherein the material releases greater than 7 weight % hydrogen.

7. The method of claim 1 wherein the material releases greater than 9 weight % hydrogen.

8. The method of claim 1 wherein said second energy level $E_2$ is related to a free energy of less than about 10 and greater than 0 kJ/mol-$H_2$.

9. The method of claim 1 wherein said destabilizing hydride is capable of releasing hydrogen in the absence of said stable hydride at a third energy level $E_3$, and wherein said second energy level $E_2$ is less than said third energy level $E_3$.

10. The method of claim 1 wherein said first energy level $E_1$ is related to a first temperature that is greater than about 250° C. required to release hydrogen at a pressure of 1 bar, and said second energy level $E_2$ is related to a second temperature that is less than about 250° C. required to release hydrogen at a pressure of 1 bar.

11. The method of claim 10 wherein said second temperature is less than about 200° C.

12. The method of claim 10 wherein said second temperature is less than about 175° C.

13. The method of claim 1 wherein said first energy level $E_1$ is related to a first equilibrium pressure that is less than 1 bar at a temperature of 400° C., and said second energy level $E_2$ is related to a second equilibrium pressure temperature that is greater than about 10 bar at a temperature of about 400° C.

14. The method of claim 1 wherein said mixture comprises a plurality of stable hydrides.

15. The method of claim 1 wherein said mixture comprises a plurality of destabilizing hydrides.

16. The method of claim 1 wherein said mixture further comprises a destabilizing compound different from said destabilizing hydride, wherein said destabilizing compound promotes release of hydrogen from the hydrogen storage material at a reduced energy level from said first energy level ($E_1$).

17. The method of claim 1 wherein prior to said reacting, reducing said stable hydride and said destabilizing hydride to a respective average particle diameter size of less than about 25 μm.

18. The method of claim 1 wherein prior to said reacting, reducing said stable hydride and said destabilizing hydride to a respective average particle diameter size of less than about 15 μm.

19. The method of claim 1 wherein said mixture further comprises one or more catalysts.

20. The method of claim 1 wherein said stable hydrogen storage hydride comprises lithium borohydride ($LiBH_4$) and said destabilizing hydride comprises calcium hydride ($CaH_2$).

21. The method of claim 1 wherein said reacting is conducted in a hydrogen atmosphere.

22. The method of claim 21 wherein said hydrogen atmosphere has a hydrogen pressure of greater than or equal to 2 atmospheres (200 kPa).

23. The method of claim 21 wherein said hydrogen atmosphere has a hydrogen pressure of greater than or equal to 5 atmospheres (500 kPa).

24. A method of reversibly storing hydrogen, the method comprising:
   providing a mixture comprising a stable hydrogen storage hydride and a destabilizing hydride, wherein said stable hydride is capable of releasing hydrogen at a first energy level ($E_1$) and is represented by the nominal general formula $AH_x$, wherein A comprises at least one element of Group 13 or Group 15 of the Periodic Table, and said destabilizing hydride is represented by the nominal general formula $MH_y$; and
   reacting said stable hydride with said destabilizing hydride to release hydrogen at a second energy level ($E_2$); wherein $E_2$ is less than $E_1$ and where said reacting occurs by the following reaction:

$$nAH_x + mMH_y \longleftrightarrow A_nM_m + \tfrac{1}{2}(nx+my)H_2$$

wherein M is one or more cationic species that are distinct from A, and n, m, x, and y are selected so as to maintain electroneutrality and said reaction is substantially reversible, and exposing the $A_nM_m$ to hydrogen to form the stable hydrogen storage hydride and destabilizing hydride.

25. The method of claim 24 wherein said stable hydride is represented by the nominal general formula $AH_x$, wherein A comprises at least one element of Group 13 or Group 15 of the Periodic Table, said destabilizing hydrogen storage hydride material represented by the nominal general formula $MH_y$, wherein said reacting occurs by the following reversible reaction:

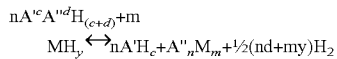

$$MH_y \leftrightarrow nA'H_c + A''_n M_m + \tfrac{1}{2}(nd+my)H_2$$

wherein M is one or more cationic species that are distinct from A, and n, m, c, d, x, and y are selected so as to maintain electroneutrality.

26. The method of claim 24 wherein said stable hydrogen storage hydride comprises lithium borohydride ($LiBH_4$) and said destabilizing hydride comprises calcium hydride ($CaH_2$).

27. A method of reversibly storing hydrogen, the method comprising:

providing a mixture comprising a stable hydrogen storage hydride and a destabilizing hydride, wherein said stable hydride is capable of releasing hydrogen at a first energy level ($E_1$); and reacting said stable hydride with said destabilizing hydride to provide at least a first hydrogen storage material and to release hydrogen at a second energy level ($E_2$); wherein $E_2$ is less than $E_1$ and $E_2$ is related to a free energy of less than about 10 and greater than 0 kJ/mol-$H_2$, and exposing the first hydrogen storage material to hydrogen to form the stable hydrogen storage hydride and the destabilizing hydride.

28. The method of claim 27 wherein said first energy level $E_1$ is related to a first temperature that is greater than about 250° C. required to release hydrogen at a pressure of 1 bar, and said second energy level $E_2$ is related to a second temperature that is less than about 250° C. required to release hydrogen at a pressure of 1 bar.

29. The method of claim 27 wherein said stable hydrogen storage hydride comprises lithium borohydride ($LiBH_4$) and said destabilizing hydride comprises calcium hydride ($CaH_2$).

* * * * *